(12) United States Patent
Little

(10) Patent No.: US 9,840,293 B2
(45) Date of Patent: Dec. 12, 2017

(54) RACK FOR SUPPORTING A BICYCLE IN A GENERALLY UPRIGHT POSITION

(71) Applicant: Dennis Charles Little, Calgary (CA)

(72) Inventor: Dennis Charles Little, Calgary (CA)

(*) Notice: Subject to any disclaimer, the term of this patent is extended or adjusted under 35 U.S.C. 154(b) by 4 days.

(21) Appl. No.: 15/135,814

(22) Filed: Apr. 22, 2016

(65) Prior Publication Data

US 2017/0305485 A1     Oct. 26, 2017

(51) Int. Cl.
*B62H 3/00* (2006.01)
*B62H 5/10* (2006.01)
*B62H 5/08* (2006.01)

(52) U.S. Cl.
CPC .............. *B62H 3/00* (2013.01); *B62H 5/08* (2013.01); *B62H 5/10* (2013.01)

(58) Field of Classification Search
CPC ... B62H 3/00; B62H 3/08; B62H 3/02; B62H 5/00; B62H 5/001; B62H 5/006; B62H 5/08; B62H 5/10; B62H 5/12; B60R 9/10; B60R 9/048; Y10S 224/924; E05B 71/00; Y10T 70/5876; Y10T 70/5881
USPC .......................................................... 211/22
See application file for complete search history.

(56) References Cited

U.S. PATENT DOCUMENTS

| 3,739,609 A | | 6/1973 | Kaufmann | |
|---|---|---|---|---|
| 3,865,246 A | * | 2/1975 | Lieb | E05B 71/00 211/5 |
| 3,934,436 A | * | 1/1976 | Candlin | B62H 3/00 211/5 |
| 3,964,611 A | * | 6/1976 | Galen | B62H 3/00 211/22 |
| 4,126,228 A | * | 11/1978 | Bala | B62H 3/08 211/22 |
| 5,025,932 A | * | 6/1991 | Jay | B60R 9/048 211/20 |
| 5,244,101 A | | 9/1993 | Palmer et al. | |

(Continued)

FOREIGN PATENT DOCUMENTS

| DE | 19537078 A1 | 4/1997 |
|---|---|---|
| FR | 2719015 A1 | 10/1995 |

(Continued)

OTHER PUBLICATIONS

Bicycle Parking Guidelines, adopted by the Association of Pedestrian and Bicycle Professionals, Spring 2002, retrieved Aug. 5, 2016 from http://www.vtpi.org/bikerack.pdf.

*Primary Examiner* — Ko Hung Chan
(74) *Attorney, Agent, or Firm* — Norton Rose Fulbright Canada LLP

(57) ABSTRACT

A rack for supporting a bicycle in a generally upright position, the rack comprising a frame comprising a curb bar; and the curb bar comprising a mounting surface for exerting a counterbalancing force on a crank assembly of the bicycle to frictionally hold the bicycle in the generally upright position. When the bicycle is supported by the curb bar, the bicycle is positioned relative to the rack for securing the bicycle to the rack. The curb bar exerts a counterbalancing force on the pedal axle or the pedal of the bicycle. The counterbalancing force may be a frictional force or a torque. Bicycles can be supported on either side of the rack, the bicycles facing in either a forward or reverse direction. The bicycle may be secured to the rack at multiple points.

25 Claims, 18 Drawing Sheets

(56) References Cited

U.S. PATENT DOCUMENTS

| | | | | |
|---|---|---|---|---|
| 5,762,248 A * | 6/1998 | Englander | ................ | B60R 9/10 224/315 |
| 5,820,002 A * | 10/1998 | Allen | ................ | B60R 9/10 211/70 |
| 6,223,907 B1 * | 5/2001 | Graber | ................ | B62H 3/00 211/17 |
| D449,256 S * | 10/2001 | Kopacz | ................ | D12/115 |
| 6,460,743 B2 * | 10/2002 | Edgerly | ................ | B60R 9/048 224/324 |
| D515,472 S * | 2/2006 | Hartger | ................ | D12/115 |
| 9,096,182 B1 * | 8/2015 | Roth | ................ | B60R 9/10 |
| 2008/0272264 A1 * | 11/2008 | Carlson | ................ | B62H 3/02 248/354.4 |

FOREIGN PATENT DOCUMENTS

| | | |
|---|---|---|
| FR | 2766784 A1 | 2/1999 |
| GB | 2268719 A | 1/1994 |
| JP | 2000135994 A | 5/2000 |
| WO | 9734795 A1 | 9/1997 |
| WO | 2015162339 A1 | 10/2015 |

* cited by examiner

RACK FOR SUPPORTING A BICYCLE IN A GENERALLY UPRIGHT POSITION

FIELD

This relates to the field bicycle security, and in particular, to a rack for supporting a bicycle in a generally upright position.

BACKGROUND

A bicycle is a popular form of transportation, as it provides various benefits. For example, cycling is a way to exercise and provides physical and mental health benefits for the cyclist. Cycling also provides environmental benefits as a bicycle does not generate pollutants during operation. Additionally, cycling may provide economic benefits as a bicycle does not require fuel or refuelling, as compared to other forms of transportation, like a car.

When not in use, a bicycle should be secured. If left unsecured in public spaces, the bicycle may be stolen, especially if the bicycle is left unattended. Moreover, an unattended bicycle may become a physical impediment and inconvenience for pedestrians or drivers.

One way to secure a bicycle is to secure it to a bicycle rack. Various bicycle racks have been developed for securing a bicycle. Such bicycle racks provide a structure to lean the bicycle, for example the frame of the bicycle, against the structure and for securing the bicycle. Unfortunately, existing bicycle racks tend not to support the bicycle in a generally upright position, so the secured bicycles have a sloppy appearance with an askew front wheel. Furthermore, existing bicycle racks may not provide multiple locations for locking the bicycle frame and wheels to the rack, and may not accommodate bicycles that lack a diamond-shaped frame or top bar. In addition, current bicycle parking areas comprising a plurality of existing bicycle racks contribute to a disorganized and unattractive appearance and tend to inefficiently use the space allotted for the bicycle parking areas.

SUMMARY

An example rack for supporting a bicycle in a generally upright position, the rack comprising: a frame comprising a curb bar; and the curb bar comprising a mounting surface for exerting a counterbalancing force on a crank assembly of the bicycle to frictionally hold the bicycle in the generally upright position.

An example rack for supporting a bicycle in a generally upright position, the rack comprising: a frame comprising a horizontal curb bar; the horizontal curb bar comprising: a mounting surface for exerting a counterbalancing force on a pedal axle or a pedal of the bicycle to counterbalance a torque in a chain ring of the bicycle, the torque generated by reverse rotation of a rear wheel of the bicycle, to frictionally hold the bicycle in the generally upright position; and slots for receiving the pedal axle to prevent forward, reverse, and lateral movement of the bicycle to hold the bicycle in the generally upright position, wherein when the pedal axle is received in the slots, a crank arm and the pedal straddle the horizontal curb bar.

Other aspects will be apparent from the description and drawings provided herein.

BRIEF DESCRIPTION OF DRAWINGS

In the figures which illustrate example embodiments.

DETAILED DESCRIPTION

A rack for supporting a bicycle in a generally upright position is disclosed. The rack may comprise a frame, which may comprise a curb bar. The curb bar may comprise a mounting surface, which may be a fixed mounting surface, to exert a counterbalancing force to counter the force and/or torque generated by the crank arm, pedal axle, and pedal assembly of the bicycle to frictionally and/or torsionally hold the bicycle in a generally upright position. The mounting surface of the curb bar may be in physical contact with a pedal or pedal axle of the bicycle for supporting the bicycle in the generally upright position. One or more bicycles may be supported and secured to the rack on the same and/or opposite sides of the rack and facing either a forward or reverse direction. When a bicycle is supported by the rack, the bicycle may be secured and locked to the rack at multiple points.

Figure 1:
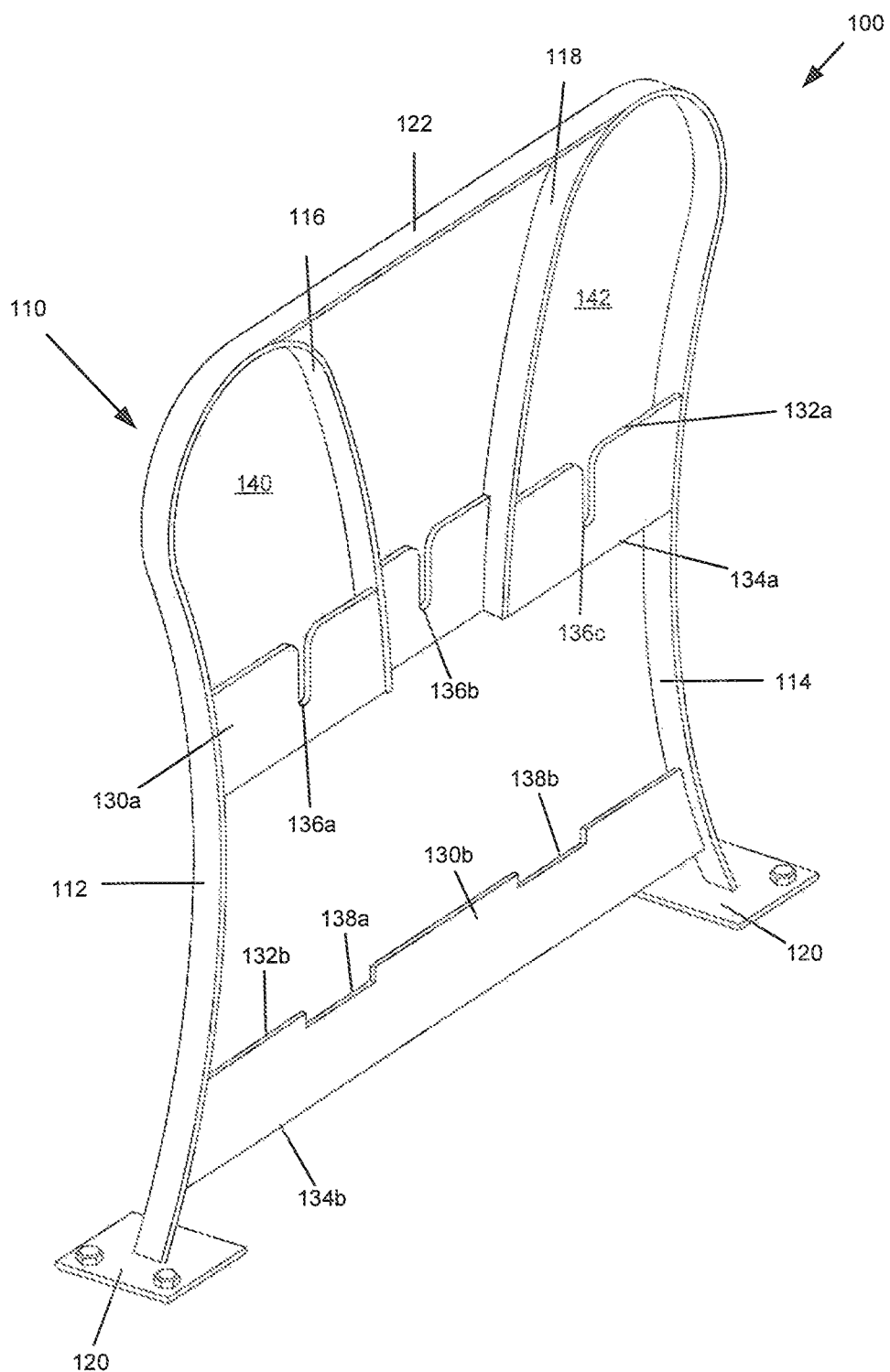
FIG. 1 is a perspective view of a rack.
Figure 2:
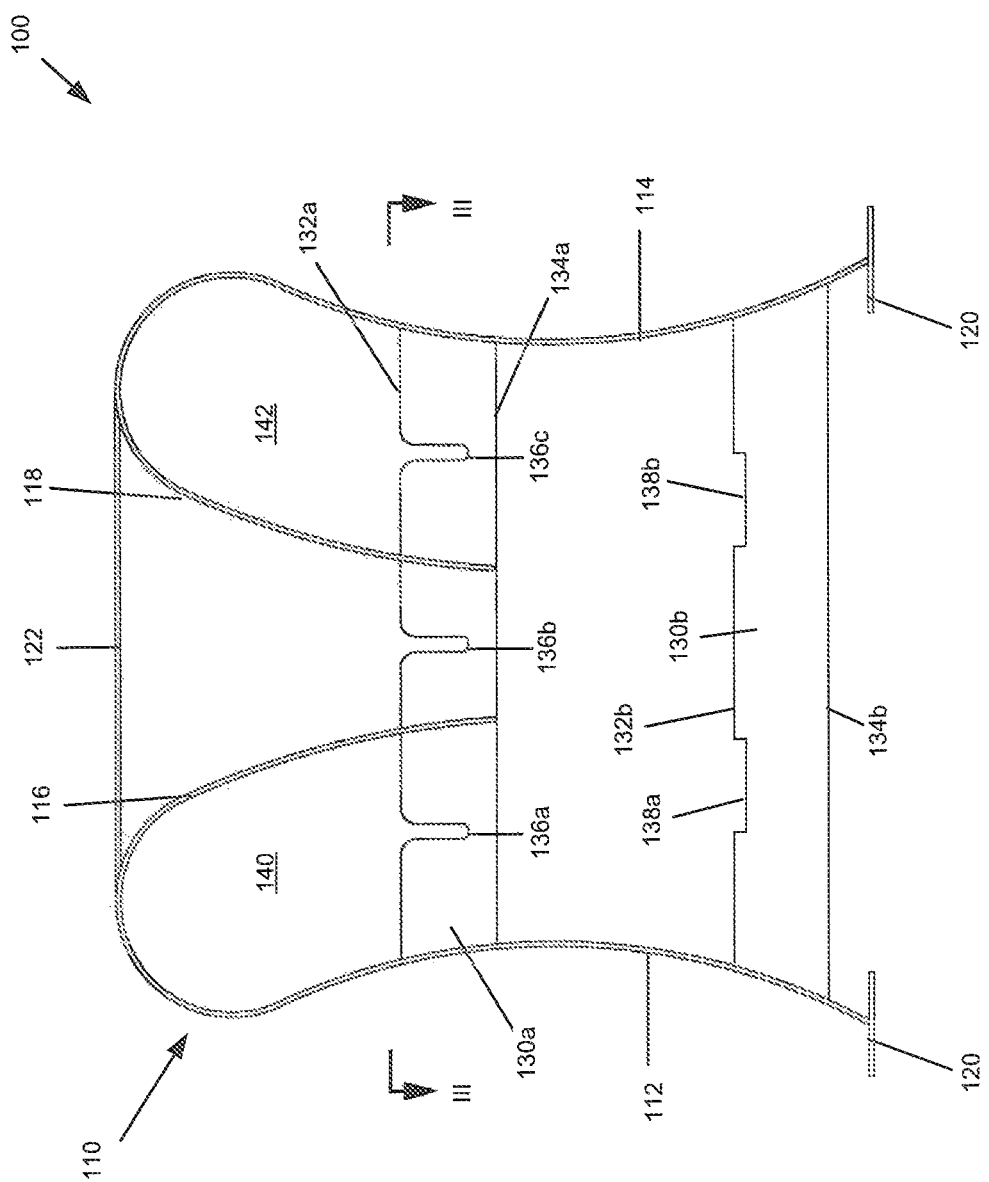
FIG. 2 is a front view of the rack of FIG. 1.

FIG. 1 a perspective view of a rack 100, and FIG. 2 is a front view of rack 100. Rack 100 may support a bicycle in a generally upright position. When the bicycle is supported in a generally upright position by rack 100, the bicycle may be secured to rack 100 at multiple points. In some embodiments, the bicycle may be generally parallel to rack 100 when the bicycle is supported by rack 100.

Rack 100 may comprise a frame 110 comprising a curb bar 130. Rack 100 may comprise no curb bars 130, or one or more curb bars 130. For example, as depicted in FIG. 1 and FIG. 2, rack 100 may comprise an upper curb bar 130a and a lower curb bar 130b. Curb bar 130 may comprise a mounting surface for exerting a counterbalancing force to counter the torque generated by the crank arm, pedal axle, and pedal assembly of a bicycle to frictionally and/or torsionally hold the bicycle in a generally upright position for securing the bicycle to rack 100.

Rack 100 may have a height and a length to support one or more bicycles on the same and/or opposite sides of rack 100, the bicycles having various configurations and sizes. In some embodiments, rack 100 may support bicycles with a diamond-shaped frame and/or bicycles without a diamond-shaped frame. In some examples, rack 100 may generally have a height of 800 mm and may generally have a length of 800 mm.

Rack 100 may comprise a first frame leg 112 and a second frame leg 114 opposing first frame leg 112. First frame leg 112 and second frame leg 114 may be positioned such that they lie on the same three-dimensional plane. In some embodiments, first frame leg 112 and second frame leg 114 may be generally straight such that frame 110 has a generally rectangular shape with rounded or pointed corners. As depicted in FIG. 1 and FIG. 2, first frame leg 112 and second frame leg 114 may be curved. In some examples, first frame leg 112 and second frame leg 114 or portions thereof may generally define a radius of curvature between 600 mm and 700 mm.

In some embodiments, rack 100 may comprise a first frame arc 116 and a second frame arc 118. As depicted in FIG. 1 and FIG. 2, an end portion of first frame leg 112 may be deflected inwardly to form first frame arc 116. Similarly, an end portion of second frame leg 114 may be deflected inwardly to form second frame arc 118. First frame arc 116 and second frame arc 118 may be curved, as shown in FIG. 1 or FIG. 2. In some embodiments, first frame arc 116 and second frame arc 118 may be generally straight.

First frame leg 112 and second frame leg 114 may be deflected using appropriate deflecting devices, such as bending tools, bending machines, computer numerical control bending machines, and the like. In some embodiments, first frame arc 116 and second frame arc 118 may be manufactured separately from first frame leg 112 and second frame leg 114. In some examples, first frame arc 116 and second frame arc 118 or portions thereof may generally define a radius of curvature of 700 mm. In some examples, the portions of first frame arc 116 and second frame arc 118 proximate to the corners of rack 100 as shown in FIG. 1 and FIG. 2 may define a radius of curvature of 150 mm. In some examples, a centre of the radius of curvature of the portions of first frame arc 116 and second frame arc 118 proximate to the corners of rack 100 may generally be 200 mm to 250 mm offset from a longitudinal axis generally perpendicular to a surface on which rack 100 is installed and intersecting the centre of rack 100.

In some embodiments, first frame leg 112 and second frame leg 114 may be manufactured with metal. First frame leg 112 and second frame leg 114 may be cast, forged, 3D-printed, computer numerical control, or machined entirely from the appropriate metal, such as hard carbon steel, stainless steel (native or recycled), aluminum (native or recycled), nickel, titanium, zinc, and the like. First frame leg 112 and second frame leg 114 may be cut from metal plates, such as standard gauge metal plates. In some examples, first frame leg 112 and second frame leg 114 may have a general width of 56 mm and a general thickness of 10 mm.

First frame leg 112 and second frame leg 114 may be fastened to a surface, for example a concrete floor, at anchors 120. Anchors 120 may be fastened to first frame leg 112 and second frame leg 114 using appropriate fasteners, such as by welding. In some embodiments, anchors 120 may be manufactured with metal, for example hard carbon steel, similar to frame leg 112 and second frame leg 114.

First frame leg 112 and second frame leg 114 may be fastened to an existing surface at anchors 120 using appropriate fasteners, such as nuts and bolts, screws, and the like, by cutting slots, for example by diamond cutting, into the existing surface. In some embodiments, anchors 120 of first frame leg 112 and second frame leg 114 may be set into a surface, for example a concrete floor, as the surface is being fabricated. When first frame leg 112 and second frame leg 114 are anchored to the surface, they may resist removal. Anchors 120 may comprise bolt holes for receiving bolts and lock washers to set first frame leg 112 and second frame leg 114 into the surface. In some examples, anchors 120 may receive half-inch bolts and the corresponding lock washers to set first frame leg 112 and second frame leg 114 into the surface, and may resist up to 3500 pounds per square inch of pressure for each bolt used.

Rack 100 may comprise a frame bar 122 in connection with first frame leg 112 and second frame leg 114. Frame bar may be fastened with first frame leg 112 and second frame leg 114 using appropriate fastening devices, such as welding. As illustrated in FIG. 1 and FIG. 2, frame bar 122 is connected to first frame leg 112 and second frame leg 114 at generally the top most point of first frame leg 112 and second frame leg 114. In some embodiments, frame bar 122 may be connected at a lower point on first frame leg 112 and second frame leg 114.

In some embodiments, frame bar 122 may be manufactured with metal, for example hard carbon steel, similar to frame leg 112 and second frame leg 114. Frame bar 122 may be cut from metal plates, such as standard gauge metal plates. In some examples, frame bar 122 may have a general width of 56 mm and a general thickness of 10 mm.

In some embodiments, first frame leg 112, second frame leg 114, first frame arc 116, second frame arc 118, anchors 120, frame bar 122, or a combination thereof, may be manufactured integrally to define a continuous frame 110 or continuous portions of frame 110. In some embodiments, first frame leg 112, second frame leg 114, first frame arc 116, second frame arc 118, anchors 120, frame bar 122, or a combination thereof may be manufactured separately and fastened together after manufacturing using appropriate fastening devices, such as welding, to form frame 110.

Rack 100 may comprise curb bar 130, curb bar 130 comprising a mounting surface that may be fixed to curb bar 130 for exerting a counterbalancing force on a crank arm, pedal axle, and pedal assembly of a bicycle and preventing reverse rotation of the crank arm, pedal axle, and pedal assembly along the path of its arc. Curb bar 130 may be generally flat and straight. In some embodiments, curb bar 130 may be curved or a portion of curb bar 130 may be offset from another portion of curb bar 130.

As depicted in FIG. 1 and FIG. 2, rack 100 may comprise upper curb bar 130a and lower curb bar 130b (collectively and individually, curb bar 130). In some embodiments, rack 100 may comprise no curb bars 130, one curb bar 130, or more than one curb bar 130.

Curb bar 130 may comprise a mounting surface that may be fixed to curb bar 130 for exerting a counterbalancing force on a crank arm, pedal axle, and pedal assembly of a bicycle to frictionally and/or torsionally hold the bicycle in a generally upright position. The mounting surface may define an upper edge 132 or a lower edge 134 of curb bar 130, and may define slots 136, or notches 138 on curb bar 130.

Upper edge 132 or lower edge 134 of curb bar 130 may be defined by mounting surfaces that may exert a counterbalancing force to counterbalance the force and/or torque generated by the crank arm, pedal axle, and pedal assembly of a bicycle for frictional and/or torsional holding of the bicycle in a generally upright position. In some embodiments, upper edge 132 or lower edge 134 of curb bar 130 may contact a pedal axle or a pedal of a crank arm, pedal axle, and pedal assembly of the bicycle. Upper edge 132 and/or lower edge 134 of curb bar 130 may be knurled to increase friction between curb bar 130 and the bicycle for frictionally and/or torsionally holding the bicycle in a generally upright position. Upper edge 132 or lower edge 134 of curb bar 130 may have a plurality of configurations. Upper edge 132 or lower edge 134 of curb bar 130 may be generally straight edges and generally parallel to the surface on which rack 100 is mounted. In some embodiments, upper edge 132 or lower edge 134 of curb bar 130 may be generally straight edges and not parallel to the surface on which rack 100 is mounted, may be curved edges, wave-like edges, crenate edges or crenellated edges, discontinuous edges, or irregular edges.

Slots 136 may be defined by a mounting surface of curb bar 130 that may exert a counterbalancing force on a crank arm, pedal axle, and pedal assembly of a bicycle for frictionally and/or torsionally holding the bicycle in a generally upright position. In some embodiments, the counterbalancing force may be a frictional force or a torque. In some embodiments, slots 136 may not exert a counterbalancing force on the bicycle. Slots 136 may be a space defined by the mounting surface of curb bar 130 that may receive an exposed portion of a pedal axle between a crank arm and a pedal.

In some embodiments, slots 136 may receive a pedal axle of a crank arm, pedal axle, and pedal assembly of the bicycle. The width of slots 136 may be sized for receiving a pedal axle with a standard pedal axle diameter. The depth of slots 136 may be sized such that when slots 136 receive a pedal axle, the bicycle may be supported on its wheels without also being supported at the end of slots 136. In some examples, slots 136 may generally have a width of 10 mm and may generally have a depth of 100 mm.

The mounting surface defining the opening of slots 136 may be bevelled, rounded, chamfered, or otherwise smoothed for receiving a pedal axle of a bicycle.

Slots 136 may be generally straight and oriented generally perpendicular to upper edge 132 or lower edge 134 of curb bar 130. In some embodiments, slots 136 may be diagonal relative to upper edge 132 or lower edge 134 such that a longitudinal axis parallel to slots 136 may define an acute or obtuse angle with upper edge 132 or lower edge 134. In some embodiments, slots 136 may be curved with a radius of curvature generally similar to a radius of an arc traced by the rotation of a pedal or pedal axle of a bicycle. In some embodiments, one or more slots 136 may have a different orientation as compared to other slots 136 on rack 100. In some embodiments, slots 136 may be located on curb bar 130 such that when a bicycle is frictionally and/or torsionally held in a generally upright position using slots 136, the bicycle may be generally aligned with rack 100 to secure and lock the bicycle on rack 100 at multiple points.

Notches 138 may be defined by a mounting surface of curb bar 130 that may exert a counterbalancing force to counter a torque that may be generated by a crank arm, pedal axle, and pedal assembly of a bicycle for frictional and/or torsional holding of the bicycle in a generally upright position. In some embodiments, the counterbalancing force may be a frictional force or a torque.

In some embodiments, notches 138 may receive a pedal of a crank assembly of the bicycle. The width of notches 138 may be sized for receiving a bicycle pedal with a standard pedal width. The depth of notches 138 may be sized for receiving a bicycle pedal with a standard pedal depth. In some embodiments, the stopping face defining notches 138 may further define slots or teeth on notches 138 to promote receiving a pedal or a pedal axle of a bicycle. In some examples, notches 138 may have a general width between 80 mm and 100 mm and may have a general depth of 10 mm.

Curb bar 130 may be fastened to first frame leg 112 and second frame leg 114 using appropriate fastening devices, such as welding and the like. In some embodiments, curb bar 130 may be integral to frame 110, for example integral to first frame leg 112 and/or second frame leg 114.

Similarly, curb bar 130 may be fastened to first frame arc 116 and second frame arc 118 using appropriate fastening devices, such as welding and the like. In some embodiments, curb bar 130 may be integral to frame 110, for example integral to first frame arc 116 and/or second frame arc 118.

As shown in FIG. 1 and FIG. 2, when curb bar 130 is connected to first frame leg 112 and first frame arc 116, either integrally or using appropriate fastening devices, they may define a first frame ring 140. Similarly, curb bar 130 in connection with second frame leg 114 and second frame arc 118 may define a second frame ring 142. First frame ring 140 and second frame ring 142 may be continuously defined such that a lock may be locked through first frame ring 140 and second frame ring 142 for securing and locking bicycle 200 to rack 100. In some embodiments, rack 100 may comprise additional frame rings. For example, rack 100 may comprise additional frame arcs generally similar to first frame arc 116 and second frame arc 118, or said additional frame arcs may be fastened using appropriate fastening devices to rack 100, such as at frame bar 122 and curb bar 130, to define additional frame rings.

In some embodiments, frame 110 may not comprise first frame arc 116 and/or second frame arc 118. First frame leg 112, second frame leg 114, frame bar 122, and curb bar 130 fastened to first frame leg 112 and second frame leg 114 may define a continuous enclosure such that a lock may be locked through said enclosure for securing and locking bicycle 200 to rack 100.

Similar to first frame leg 112 and second frame leg 114, curb bar 130 may be manufactured with metal. Curb bar 130 may be cast, forged, 3D-printed, computer numerical control, or machined entirely from the appropriate metal, such as hard carbon steel, stainless steel (native or recycled), aluminum (native or recycled), nickel, titanium, zinc, and the like. Curb bar 130 may be cut from metal plates, such as standard gauge metal plates. In some examples, curb bar 130 may have a general width of 100 mm to 150 mm and a general thickness of 7 mm. In some examples, curb bar 130 may have a length generally similar to the length of rack 100.

As shown in FIG. 1 and FIG. 2, upper curb bar 130*a* may comprise upper edge 132*a* and lower edge 134*a*. In some examples, upper edge 132*a* of upper curb bar 130*a* may be generally positioned at a height of 500 mm from a surface on which rack 100 is mounted. Upper edge 132*a* of upper curb bar 130*a* may comprise slots 136*a*, 138*b*, and 136*c* (individually and collectively, slot 136). In some embodiments, curb bar 130 may comprise no slots, one slot, or more than one slot.

Slots 136*a*, 136*b*, and 136*c* may be positioned relative to upper curb bar 130*a* such that when a bicycle is supported by rack 100 using slots 136*a*, 138*b*, and 136*c*, the bicycle may be secured to rack 100 at multiple points. In some embodiments, curb bar 130*a* may comprise one or more slots 136 for supporting bicycles on both sides of rack 100. In some embodiments, slot 136*b* may be located generally at the centre of upper support member 130*a*. In some examples, slot 138*a* and slot 136*c* may be generally 200 mm to 250 mm from slot 136*b*.

In some embodiments, upper curb bar 130*a* may comprise one or more slots 136 and/or one or more notches 138 on upper edge 132*a* and/or lower edge 134*a* of upper curb bar 130*a*. In some embodiments, upper curb bar 130*a* may not comprise slots 136 or notches 138.

As shown in FIG. 1 and FIG. 2, similar to upper curb bar 130*a*, lower curb bar 130*b* may comprise upper edge 132*b* and lower edge 134*b*. In some examples, upper edge 132*b* of lower curb bar 130*b* may be generally positioned at a height of 150 mm from a surface on which rack 100 is mounted. As depicted in FIG. 1 and FIG. 2, upper edge 132*b* of lower curb bar 130*b* may comprise notches 138*a* and 138*b* (individually and collectively, notch 138). In some embodiments, lower curb bar 130*b* may comprise one or more notches 138 for supporting bicycles on both sides of rack 100. Notches 138*a* and 138*b* may be positioned relative to rack 100 such that when a bicycle is supported by rack 100, the bicycle may be secured to rack 100 at several points. As illustrated in FIG. 1 and FIG. 2, notches 138*a* and 138*b* may be located between the centre and the ends of lower curb bar 130*b*. In some examples, notches 138*a* and 138*b* may be positioned generally 100 mm away from the centre of lower curb bar 130*b*.

In some embodiments, lower curb bar 130*b* may comprise one or more slots 136 and/or one or more notches 138 on upper edge 132*b* and/or lower edge 134*b* of lower curb bar 130*b*. In some embodiments, lower curb bar 130*b* may not comprise slots 136 or notches 138.

In some embodiments, rack 100 or a portion of rack 100 may comprise a mounting surface that may be fixed to rack 100 for exerting a counterbalancing force on a crank arm, pedal axle, and pedal assembly of a bicycle and preventing reverse rotation of the crank arm, pedal axle, and pedal assembly along the path of its arc in a manner generally similar to and comprising features generally similar to curb bar 130 as described herein.

In some embodiments, curb bar 130 may be a generally flat plate and may have a generally straight and continuous cross-section with a generally straight and continuous upper edge 132 and/or lower edge 134.

In some embodiments, curb bar 130 may be a plate with different cross-sections. For example, curb bar 130 may be a plate with a curved cross-section, wave-like cross-section or a sinusoidal cross-section. In some embodiments, curb bar 130 may be a plate with a cross-section comprising two or more straight discontinuous portions, where one or more portions of curb bar 130 is not aligned with the remaining portions of curb bar 130.

Figure 3:
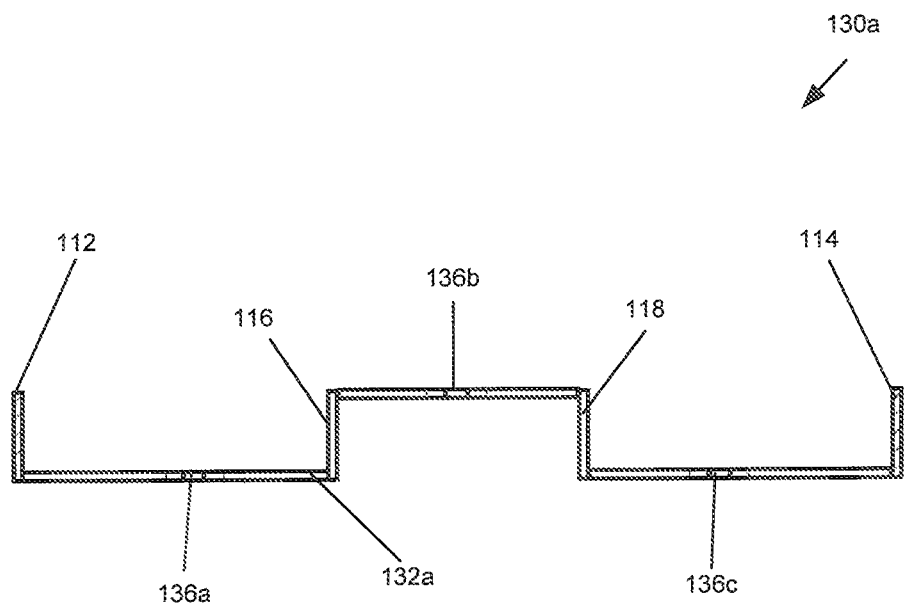
FIG. 3 is a top view of an upper curb bar of the rack of FIG. 1 along line III-III shown in FIG. 2.

In some embodiments, curb bar 130 may have a crenellated cross-section with a discontinuous upper edge 132 and/or lower edge 134, for example, as depicted in FIG. 3. FIG. 3 is a top view of upper curb bar 130*a* along line 111411 shown in FIG. 2. As depicted in FIG. 3, the portion of upper curb bar 130*a* comprising slot 136*b* may be offset from the portions of upper curb bar 130*a* comprising slot 136*a* and slot 136*c*. A portion of curb bar 130 may be offset for reducing interference between components of bicycles supported on both sides of rack 100. For example, the offset design of upper curb bar 130*a* as shown in FIG. 3 may permit access in a forward and/or reverse direction for one or more bicycles 200 on the same and/or opposite sides of rack 100 at the same time. The offset design of upper curb bar 130*a* may reduce or remove conflict of handle bars and seats of bicycles 200 on opposite sides of rack 100, may reduce or remove conflict of a pedal of bicycle 200 on one side of rack 100 and a frame of bicycle 200 on the other side of rack 100, and may promote the securing of bicycles 200 on both sides of rack 100.

In some embodiments, the portions of upper curb bar 130*a* comprising slots 136*a*, 136*b*, and 136*c* may be manufactured integrally. In some embodiments, the portions of upper curb bar 130*a* comprising slots 136*a*, 136*b*, and 136*c* may be manufactured separately and fastened with first frame leg 112, second frame leg 114, first frame arc 116, and second frame arc 118 using appropriate fastening devices. In some embodiments, one or more curb bars 130, for example upper curb bar 130*a* and lower curb bar 130*b*, may have an offset design as illustrated in FIG. 3.

Figure 4:
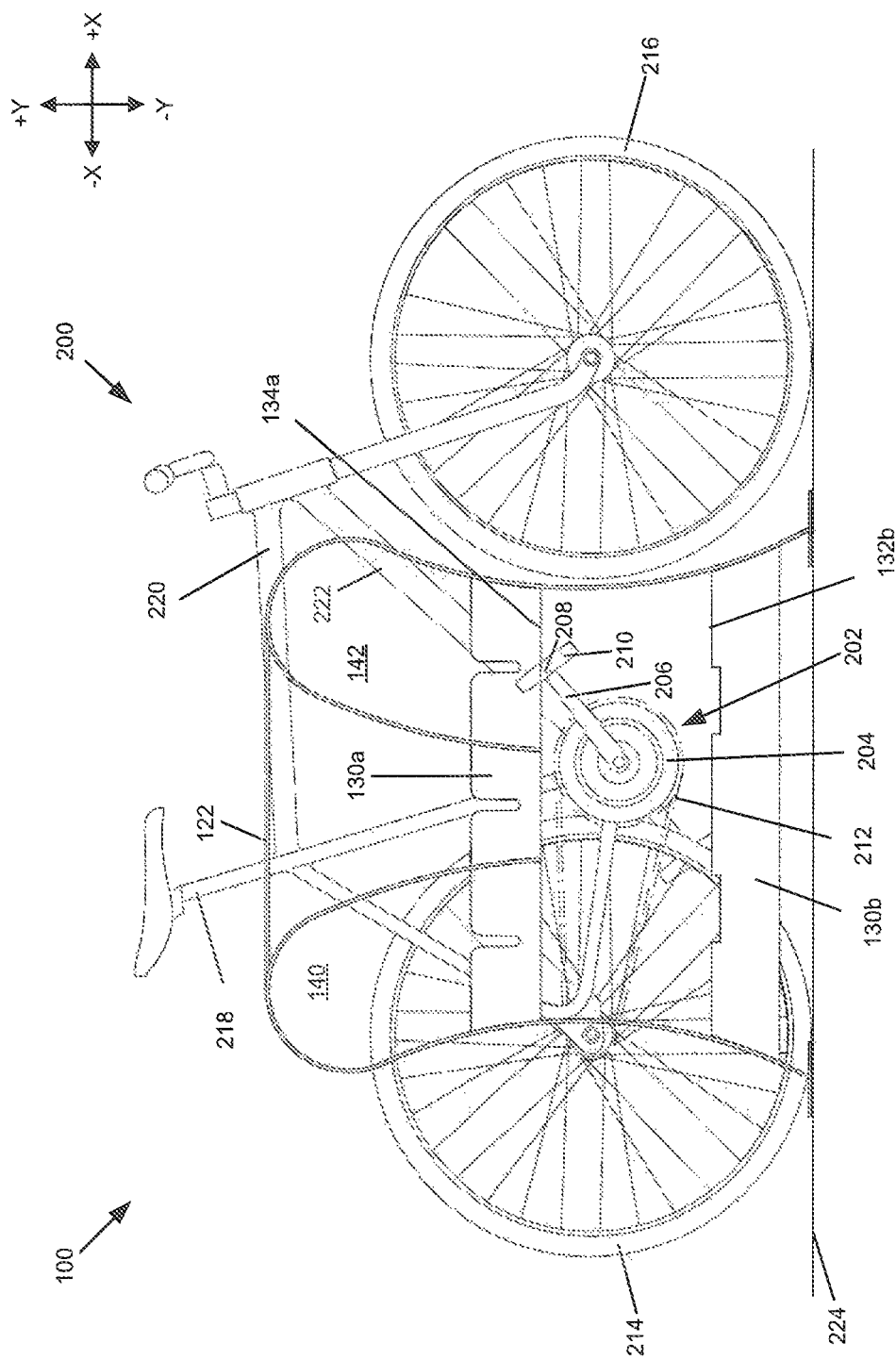
FIG. 4 is a schematic view of a bicycle supported at a pedal axle of the crank arm, pedal axle, and pedal assembly on the lower edge of the upper curb bar of the rack of FIG. 1.

FIG. 4 is a schematic view of a bicycle 200 supported at a crank assembly 202 of bicycle 200 by a lower edge 134*a* of upper curb bar 130*a* of rack 100. Rack 100 may support bicycles of different configurations and types. Bicycle 200 as depicted in FIG. 4 may be a common bicycle with a diamond-shaped frame, such as a road bicycle or a mountain bicycle. In some embodiments, bicycle 200 may be a bicycle with or without a diamond-shaped frame, a bicycle made for an adult, a bicycle made for a child, a recumbent bicycle, a touring bicycle, a hand cycle, and the like.

In some embodiments, crank assembly 202 of bicycle 200 may comprise a chain ring 204, a crank arm 206, a pedal axle 208, and a pedal 210. Crank arm 206, pedal axle 208, and pedal 210 may comprise the crank arm, pedal axle, and pedal assembly as referred to herein. Rotation of chain ring 204 in a forward or reverse direction may cause crank arm 206 to rotate in the same forward or reverse direction. Similarly, rotation of crank arm 206 in a forward or reverse direction may cause chain ring 204 to rotate in the same forward or reverse direction.

As will be described in greater detail herein, rotation of a rear wheel of bicycle 200 in a reverse direction may cause chain ring 204 and crank arm 206 to rotate in the same reverse direction, yet rotation of a rear wheel of bicycle 200 in a forward direction may not cause chain ring 204 and crank arm 206 to rotate in the same forward direction. Similarly, rotation of chain ring 204 and crank arm 206 in a forward direction may cause the rear wheel of bicycle 200 to rotate in the same forward direction, yet rotation of chain ring 204 and crank arm 206 in a reverse direction may not cause the rear wheel of bicycle 200 to rotate in the same reverse direction.

Chain ring 204 may be fastened to one end of crank arm 206 using appropriate fastening devices, such as bearings, brackets, pins, screws, nuts and bolts, and the like. In some embodiments, crank arm 206 may be fastened generally at the centre of chain ring 204.

The other end of crank arm 206 may be fastened to one end of pedal axle 208. Crank arm 206 may be fastened to pedal axle 208 using appropriate fastening devices.

The other end of pedal axle 208 may be received in a pedal axle channel 209 of pedal 210 and fastened to pedal 210 using appropriate fastening devices. Pedal axle channel 209 may be integral to pedal 210. In some embodiments, pedal axle channel 209 may be a longitudinal channel extending through generally the centre of pedal 210, as shown, for example, in FIG. 6 and FIG. 8. When pedal axle 208 is received in pedal axle channel 209 of pedal 210, pedal 210 may rotate relative to pedal axle 208 about pedal axle channel 209. A portion of pedal axle 208 may be exposed between crank arm 206 and pedal 210. In some examples, approximately 10 mm to 15 mm of pedal axle 208 may be exposed between crank arm 206 and pedal 210.

Chain ring 204 may comprise teeth along a circumference or edge of chain ring 204 for receiving a chain 212. Chain 212 may, for example, be a roller chain comprising a plurality of chain links.

In some embodiments, bicycle 200 may further comprise a rear wheel 214 and a front wheel 216. Rear wheel 214 may be fastened to a rear wheel hub of bicycle 200 using appropriate fastening devices, such as bearings, brackets, pins, screws, nuts and bolts, and the like. The rear wheel hub may comprise a rear wheel gear sprocket that may comprise teeth similar to the teeth of chain ring 204 for receiving chain 212. The rear wheel hub of bicycle 200 may further comprise a freewheel comprising a ratchet and pawl mechanism. The ratchet and pawl mechanism may allow rear wheel 214 to rotate in a forward manner, for example manually, without causing chain 212 and chain ring 204 to rotate in a forward manner, as described further below. Similarly, manually rotating rear wheel 214 in a reverse manner may engage the ratchet and pawl mechanism in the freewheel, such that the rotation of rear wheel 214 may cause chain 212, chain ring 204, crank arm 206, pedal axle 208, and pedal 210 to rotate in the same reverse direction.

Bicycle 200 may further comprise a seat bar 218, a top bar 220, and a down bar 222. Seat bar 218, top bar 220, and down bar 222 may be fastened together using appropriate fastening devices, such as welding. Seat bar 218, top bar 220, and down bar 222 may comprise a portion of a structural frame of bicycle 200.

Crank assembly 202, rear wheel 214, and front wheel 216 may be fastened to the structural frame of bicycle 200 using appropriate fastening devices, such as bearings, brackets, pins, screws, nuts and bolts, and the like.

In some embodiments, forward rotation of chain ring 204 may cause rear wheel 214 to rotate in the same forward rotation.

When operating bicycle 200 to move in a forward direction, a force, such as from a foot of a cyclist, may be applied to pedal 210. The force applied to pedal 210 may be translated to a torque applied to chain ring 204 through crank arm 206. The torque may cause chain ring 204 to rotate in a forward direction. The rotation of chain ring 204 may apply a tension to chain 212 received in the teeth of chain ring 204 and may cause chain 212 to rotate about chain ring 204. Since chain 212 may be connected to chain ring 204 and the rear wheel gear sprocket, chain 212 may cause the rear wheel gear sprocket to rotate in a forward direction. As the rear wheel gear sprocket rotates in a forward direction, it may cause the pawl of the ratchet and pawl mechanism to rotate in the same forward direction and the pawl may engage and lock with the ratchet. Upon engagement and locking of the pawl to the ratchet, the forward rotation of the pawl may be translated to the ratchet, which may cause rear wheel 214 to rotate in the same forward rotation. When bicycle 200 is resting on a surface 224 such that rear wheel 214 is in physical contact with surface 224, there may be friction between rear wheel 214 and surface 224. Applying a force on pedal 210 to rotate chain ring 204 in a forward direction may drive bicycle 200 in a forward direction based on the friction between rear wheel 214 and surface 224.

Reverse rotation of pedal 210 may cause the pawl mechanism to disengage and unlock with the ratchet, such that pedal 210 may rotate in a reverse direction without also causing rear wheel 214 to rotate in a reverse direction.

Similarly, forward rotation of rear wheel 214 may not cause the pawl and ratchet to engage and lock, such that forward rotation of rear wheel 214 may not cause chain ring 204 to rotate in a forward direction.

However, reverse rotation of rear wheel 214 may cause the paw and ratchet to engage and lock, such that reverse rotation of rear wheel 214 may cause chain ring 204 to rotate in a reverse direction.

In some embodiments, bicycle 200 may be supported in a generally upright position at the exposed portion of pedal axle 208 or pedal 210 by lower edge 134a of upper curb bar 130a of rack 100 with the weight of bicycle 200 supported by rear wheel 214 and front wheel 216. As depicted in FIG. 4, bicycle 200, facing in the positive-X direction, may be supported in a generally upright position at the exposed portion of pedal axle 208 by lower edge 134a of upper curb bar 130a. Crank arm 206 proximate to rack 100 may be pointed in the positive-X and positive-Y direction for pedal axle 208 to be positioned against lower edge 134a of upper curb bar 130a.

Bicycle 200 may be placed generally parallel against rack 100 as illustrated in FIG. 4 to promote placement of pedal axle 208 against lower edge 134a of upper curb bar 130a. A force, for example from a foot of a cyclist, may be applied on a pedal opposing pedal 210 so that pedal axle 208 may be in physical contact with and may apply a force to lower edge 134a of upper curb bar 130a.

The physical contact between pedal axle 208 and lower edge 134a of upper curb bar 130a, and the force applied by pedal axle 208 to lower edge 134a of upper curb bar 130a, may be increased by raising rear wheel 214 and rotating rear wheel 214 in a reverse direction. This may remove the slack in chain 212. As described herein, the reverse rotation of rear wheel 214 may apply torque to chain ring 204 through chain 212 and may cause chain ring 204 to rotate in the same reverse rotation. The reverse rotation of chain ring 204 may cause crank arm 208 to rotate in the same reverse rotation. This reverse rotation of crank arm 206 may cause pedal axle 208 to rotate and apply a force against lower edge 134a of upper curb bar 130a, and increase the physical contact between pedal axle 208 and lower edge 134a of upper curb bar 130a. As reverse rotation of rear wheel 214 continues, the force applied by pedal axle 208 to lower edge 134a of upper curb bar 130a and the torque applied to chain ring 204 through chain 212 may increase.

Rear wheel 214 may be lowered to rest on surface 224. The friction force between rear wheel 214 and surface 224 may maintain the torque in chain ring 204, the physical contact between pedal axle 208 and lower edge 134a of upper curb bar 130a, and the force applied by pedal axle 208 to lower edge 134a of upper curb bar 130a.

The force applied by pedal axle 208 to lower edge 134a of upper curb bar 130a may create frictional force between pedal axle 208 and lower edge 134a of upper curb bar 130a, which may hold pedal axle 208 against lower edge 134a of upper curb bar 130a. When pedal axle 208 is in contact with lower edge 134a of upper curb bar 130a, lower edge 134a of upper curb bar 130a may prevent reverse rotation of the crank arm 206, pedal axle 208, and pedal 210. Lower edge 134a of upper curb bar 130a may apply a generally equal and opposite force to pedal axle 208. This force applied from lower edge 134a of upper curb bar 130a may translate to a torque that may be applied to chain ring 204 to counterbalance the torque applied to chain ring 204 by rear wheel 214. These balanced forces and torques may restrict movement of bicycle 200, crank assembly 202, chain 212, and rear wheel 214.

With pedal axle 208 in physical contact against lower edge 134a of upper curb bar 130a, lower edge 134a of upper curb bar 130a may frictionally and/or torsionally hold bicycle 200 in a generally upright position.

When bicycle 200 is supported by against lower edge 134a of upper curb bar 130a in a generally upright position, as depicted in FIG. 4, bicycle 200 may be locked to rack 100 at multiple points. For example, seat bar 218 and/or rear wheel 214 may be locked through first frame ring 140, top bar 220 may be locked with frame bar 122, down bar 222 and/or front wheel 216 may be locked through second frame ring 142, or a combination thereof. Rear wheel 214, front wheel 216, seat bar 218, top bar 220, and/or down bar 222 may be locked to rack 100 using appropriate locking devices, such as a U-lock, cable lock, chain and padlock, combination lock, and the like.

As depicted in FIG. 4, bicycle 200 may be facing in the positive-X direction with crank arm 206 proximate to rack 100 pointed in the positive-X and positive-Y direction when supported in a generally upright position at pedal axle 208 by lower edge 134a of upper curb bar 130a. In some embodiments, bicycle 200 may be facing in the negative-X direction with crank arm 206 proximate to rack 100 pointed in the negative-X and positive-Y direction when supported in a generally upright position at pedal axle 208 by lower edge 134a of upper curb bar 130a.

In some embodiments, bicycle 200 may be supported in a generally upright position at pedal axle 208 by any available portion of lower edge 134a of upper curb bar 130a not occupied by pedal axle 208 of another bicycle 200. This may allow one or more other bicycles 200 to be supported at pedal axle 208 by lower edge 134a of upper curb bar 130a, either on the same side of rack 100 as bicycle 200 or on the opposite side of rack 100, in a generally upright position facing in either the positive-X or negative-X direction.

In some embodiments, bicycle 200 may be supported in a generally upright position at pedal 210 by lower edge 134a of upper curb bar 130a in a generally similar manner as described above.

Bicycle 200 may similarly be supported in a generally upright position at the exposed portion of pedal axle 208 by upper edge 132b of lower curb bar 130b of rack 100 with the weight of bicycle 200 supported by rear wheel 214 and front wheel 216. Bicycle 200 may be facing the positive-X direction as depicted in FIG. 4. Bicycle 200 may be supported in a generally upright position at the exposed portion of pedal axle 208 by upper edge 132b of lower curb bar 130b to support bicycle 200 in a generally upright position. Crank arm 206 proximate to rack 100 may be pointed in the negative-X and negative-Y direction for pedal axle 208 to be positioned against upper edge 132b of lower curb bar 130b.

Pedal axle 208 may be in physical contact with and may apply a force to upper edge 132b of lower curb bar 130b. Said physical contact and force may be developed through the crank assembly 202 and increased by rotating rear wheel 214 in a reverse direction as described herein.

Similar to lower edge 134a of upper curb bar 130a, the force applied by pedal axle 208 to upper edge 132b of lower curb bar 130b may create friction between pedal axle 208 and upper edge 132b of lower curb bar 130b, which may hold pedal axle 208 against upper edge 132b of lower curb bar 130b. When pedal axle 208 is in contact with upper edge 132b of lower curb bar 130b, upper edge 132b of lower curb bar 130b may prevent reverse rotation of the crank arm 206, pedal axle 208, and pedal 210. The upper edge 132b of lower curb bar 130b may apply a generally equal and opposite force to pedal axle 208. This force applied from upper edge 132b of lower curb bar 130b may translate to a torque that may be applied to chain ring 204 to balance the torque applied to chain ring 204 by rear wheel 214. These balanced forces and torques may restrict movement of bicycle 200, crank assembly 202, chain 212, and rear wheel 214.

With pedal axle 208 in physical contact against upper edge 132b of lower curb bar 130b, upper edge 132b of lower curb bar 130b may frictionally and/or torsionally hold bicycle 200 in a generally upright position.

When bicycle 200 is supported by upper edge 132b of lower curb bar 130b in a generally upright position, bicycle 200 may be locked to rack 100 at multiple points. For example, seat bar 218 and/or rear wheel 214 may be locked through first frame ring 140, top bar 220 may be locked with frame bar 122, down bar 222 and/or front wheel 216 may be locked through second frame ring 142, or a combination thereof. Rear wheel 214, front wheel 216, seat bar 218, top bar 220, and/or down bar 222 may be locked to rack 100 using appropriate locking devices, such as a U-lock, cable lock, chain and padlock, combination lock, and the like.

Bicycle 200 may be facing in the positive-X direction with crank arm 206 proximate to rack 100 pointed in the negative-X and negative-Y direction when supported in a generally upright position at pedal axle 208 by upper edge 132b of lower curb bar 130b. In some embodiments, bicycle 200 may be facing in the negative-X direction with crank arm 206 proximate to rack 100 pointed in the positive-X and negative-Y direction when supported in a generally upright position at pedal axle 208 by upper edge 132b of lower curb bar 130b.

In some embodiments, bicycle 200 may be supported in a generally upright position at pedal axle 208 by any available portion of upper edge 132b of lower curb bar 130b not occupied by pedal axle 208 of another bicycle 200. This may allow one or more other bicycles 200 to be supported at pedal axle 208 by upper edge 132*b* of lower curb bar 130*b*, either on the same side of rack 100 as bicycle 200 or on the opposite side of rack 100, in a generally upright position facing in either the positive-X or negative-X direction.

In some embodiments, bicycle 200 may be supported in a generally upright position at pedal 210 by upper edge 132*b* of lower curb bar 130*b* in a generally similar manner as described above.

Figure 5:
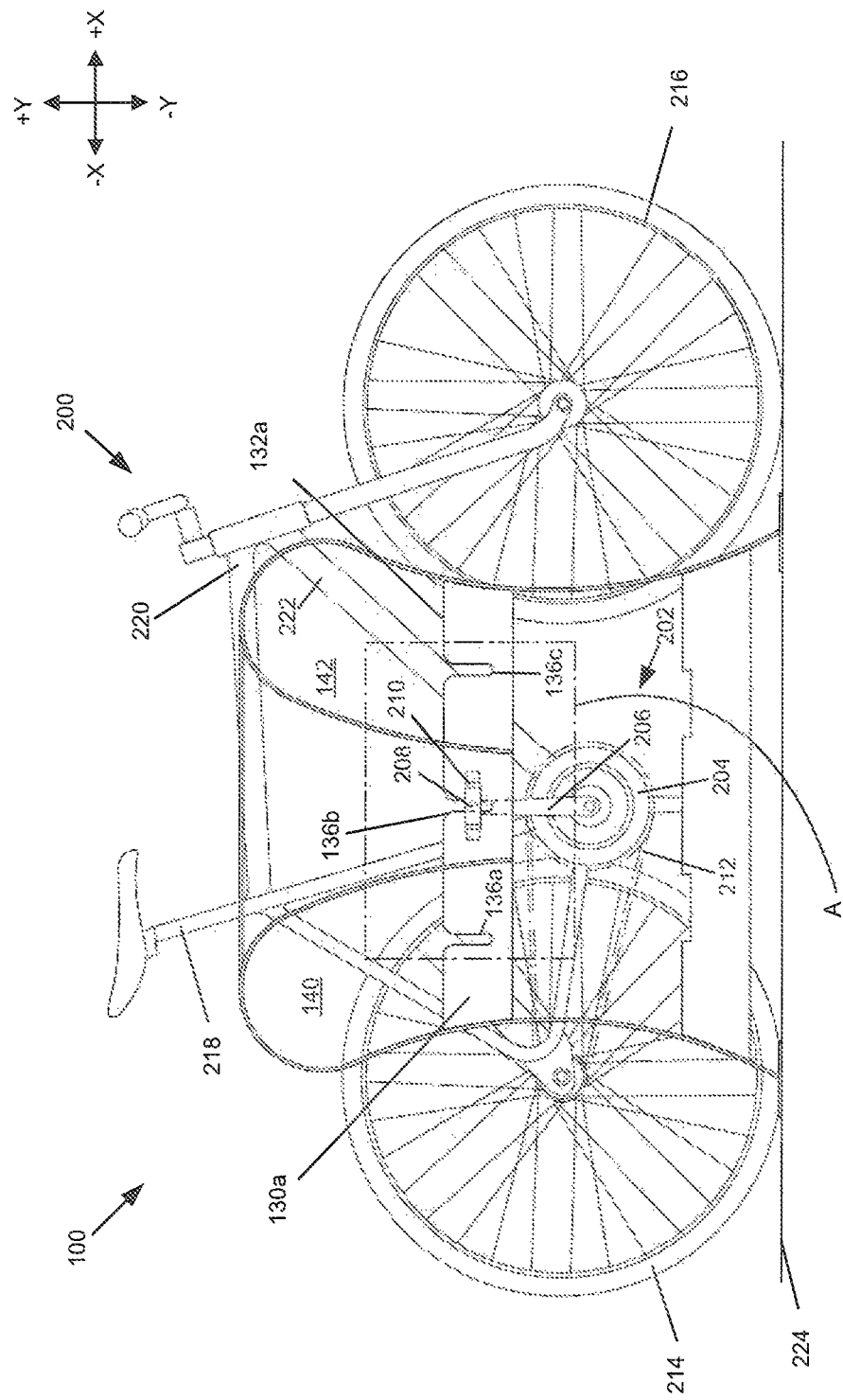
FIG. 5 is a schematic view of a bicycle supported at a pedal axle of the crank arm, pedal axle, and pedal assembly in the middle slot on the upper edge of the upper curb bar of the rack of FIG. 1.
Figure 6:
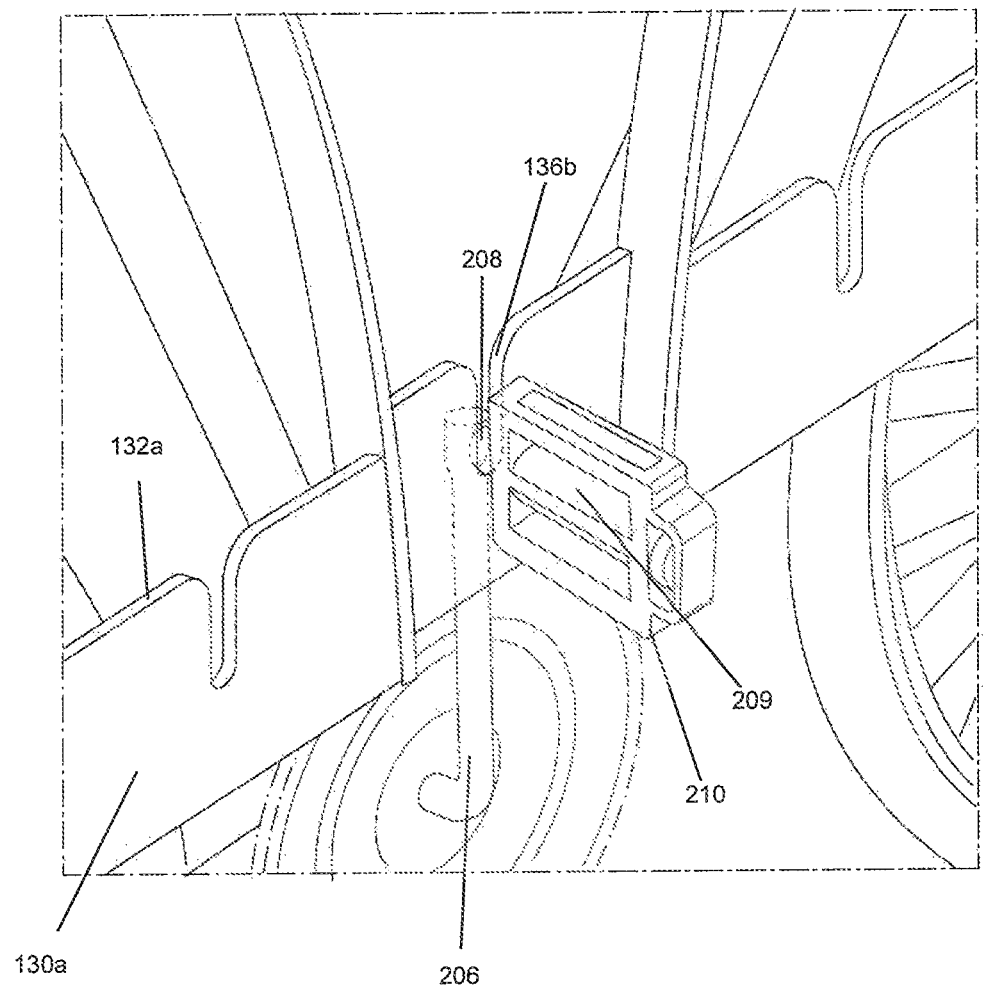
FIG. 6 is an enlarged perspective view of a portion of the rack of FIG. 5, the portion identified by window A as shown in FIG. 5, showing the interface of the pedal axle of the crank arm, pedal axle, and pedal assembly and the middle slot of the upper curb bar.
Figure 8:
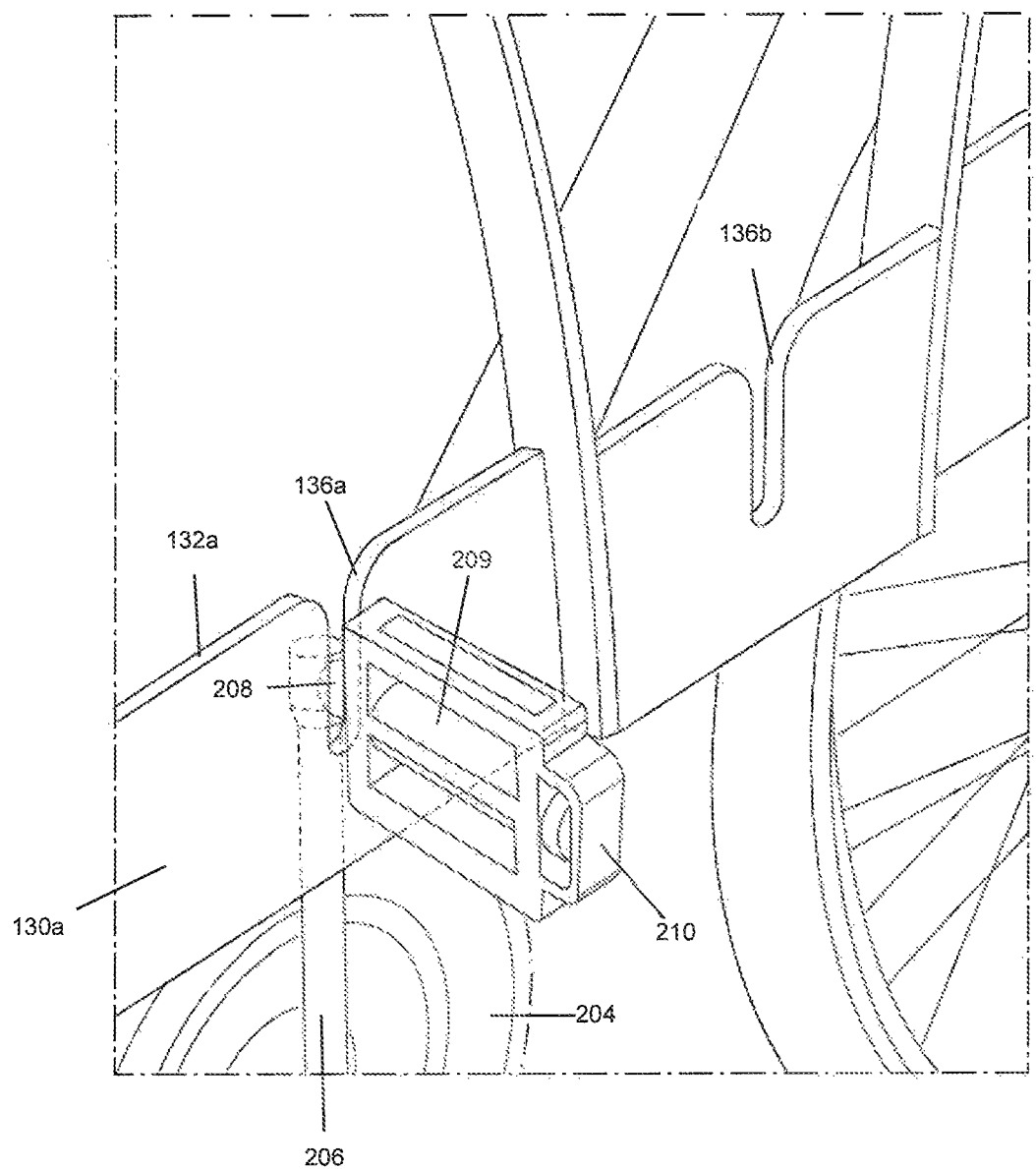
FIG. 8 is an enlarged perspective view of a portion of the rack of FIG. 7, the portion identified by window B as shown in FIG. 7, showing the interface of the pedal axle of the crank arm, pedal axle, and pedal assembly and another slot on the upper edge of the upper curb bar.

In some embodiments, bicycle 200 may be supported in a generally upright position at the exposed portion of pedal axle 208 by slots 136 with the weight of bicycle 200 supported by rear wheel 214 and front wheel 216. As depicted in FIG. 8 and FIG. 6, slots 136*a*, 136*b*, and 136*c* may be installed on upper edge 132*a* of upper curb bar 130*a*. When bicycle 200 is supported by slots 136, crank arm 206 may be pointed generally vertically in the positive-Y direction for pedal axle 208 to be received in slot 136, for example slot 136*b* as illustrated in FIG. 5. In some embodiments, slots 136 may be installed on lower edge 134*a* of upper curb bar 130*a*, or slots 136 may be installed on upper edge 132*b* or lower edge 134*b* of lower curb bar 130*b*

Bicycle 200 may be positioned adjacent and generally parallel to rack 100. As depicted in FIG. 5, bicycle 200 may facing the positive-X direction. In some embodiments, bicycle 200 may be facing the negative-X direction. Bicycle 200 may be lifted and positioned such that pedal axle 208 may be above slot 136*b*. Bicycle 200 may be lowered, so slot 136*b* may receive pedal axle 208, and bicycle 200 may be rested on surface 224 with the weight of bicycle 200 supported by rear wheel 214 and front wheel 216. In some embodiments, pedal axle 208 may not be in physical contact or be applying a force to the edges of slot 136*b*.

As shown in FIG. 5 and FIG. 6, with pedal axle 208 received in slot 136*b*, crank arm 206 may be on one side of upper curb bar 130*a* and pedal 210 may be on the other side of upper curb bar 130*a*, such that crank arm 206 and pedal 210 may be straddling upper curb bar 130*a*. The width of slot 138*b* may be narrower than the diameter of crank arm 206 and narrower than the length or width of pedal 210. When pedal axle 208 is received in slot 136*b*, upper curb bar 130*a* may prevent lateral movement of bicycle 200. In some embodiments, bicycle 200 may be prevented from falling away from rack 100 when pedal axle 208 is received in slot 136*b*. In some embodiments, bicycle 200, for example the frame of bicycle 200, may be prevented from leaning against rack 100.

The edges of slot 136*b* may restrict bicycle 200 from forward or reverse movement. The edges of slot 136B may apply a force against pedal axle 208 when bicycle 200 moves forward or in reverse.

In some embodiments, rear wheel 214 may be rotated in a reverse direction such that pedal axle 208 may be in physical contact with and applying a force to edges of slot 136*b* in a manner generally similar to pedal axle 208 contacting and applying a force to upper edge 132 or lower edge 134 of curb bar 130 as described herein for restricting movement of bicycle 200, crank assembly 202, chain 212, and rear wheel 214.

With pedal axle 208 received in slot 136*b* and/or be in physical contact against the edges of slot 1386, slot 136*b* may frictionally and/or torsionally hold bicycle 200 in a generally upright position.

When bicycle 200 is supported by slot 136*b* in a generally upright position, as illustrated in FIG. 5 and FIG. 6, bicycle 200 may be locked to rack 100 at multiple points. For example, seat bar 218 and/or rear wheel 214 may be locked through first frame ring 140, top bar 220 may be locked with frame bar 122, down bar 222 and/or front wheel 216 may be locked through second frame ring 142, or a combination thereof. Rear wheel 214, front wheel 216, seat bar 218, top bar 220, and/or down bar 222 may be locked to rack 100 using appropriate locking devices, such as a U-lock, cable lock, chain and padlock, combination lock, and the like.

In some embodiments, slots 136 may be curved with a radius of curvature generally similar to a radius of an arc traced by rotation of pedal axle 208 or pedal 210 about a centre of chain ring 204 of bicycle 200. Bicycle 200 may be lifted and lowered for pedal axle 208 to be received in the opening of curved slot 136. A force, for example from a foot of a cyclist, may be applied on a pedal opposing pedal 210 so that pedal axle 208 may be received in curved slot 136. Pedal axle 208 may be in physical contact with and may apply a force to an edge of curved slot 136, for example, the end of curved slot 136. As described herein, said force may be increased by rotating rear wheel 214 in a reverse direction.

As described herein, the force applied by pedal axle 208 to an edge of curved slot 136 may create friction between pedal axle 208 and the edge of curved slot 136, which may hold pedal axle 208 against the edge of curved slot 136. This force applied from the edge of curved slot 136 may translate to a torque that may be applied to chain ring 204 to balance the torque applied to chain ring 204 by rear wheel 214. These balanced forces and torques may restrict movement of bicycle 200, crank assembly 202, chain 212, and rear wheel 214.

With pedal axle 208 in physical contact against curved slot 136, curved slot 136 may frictionally and/or torsionally hold bicycle 200 in a generally upright position.

Figure 7:
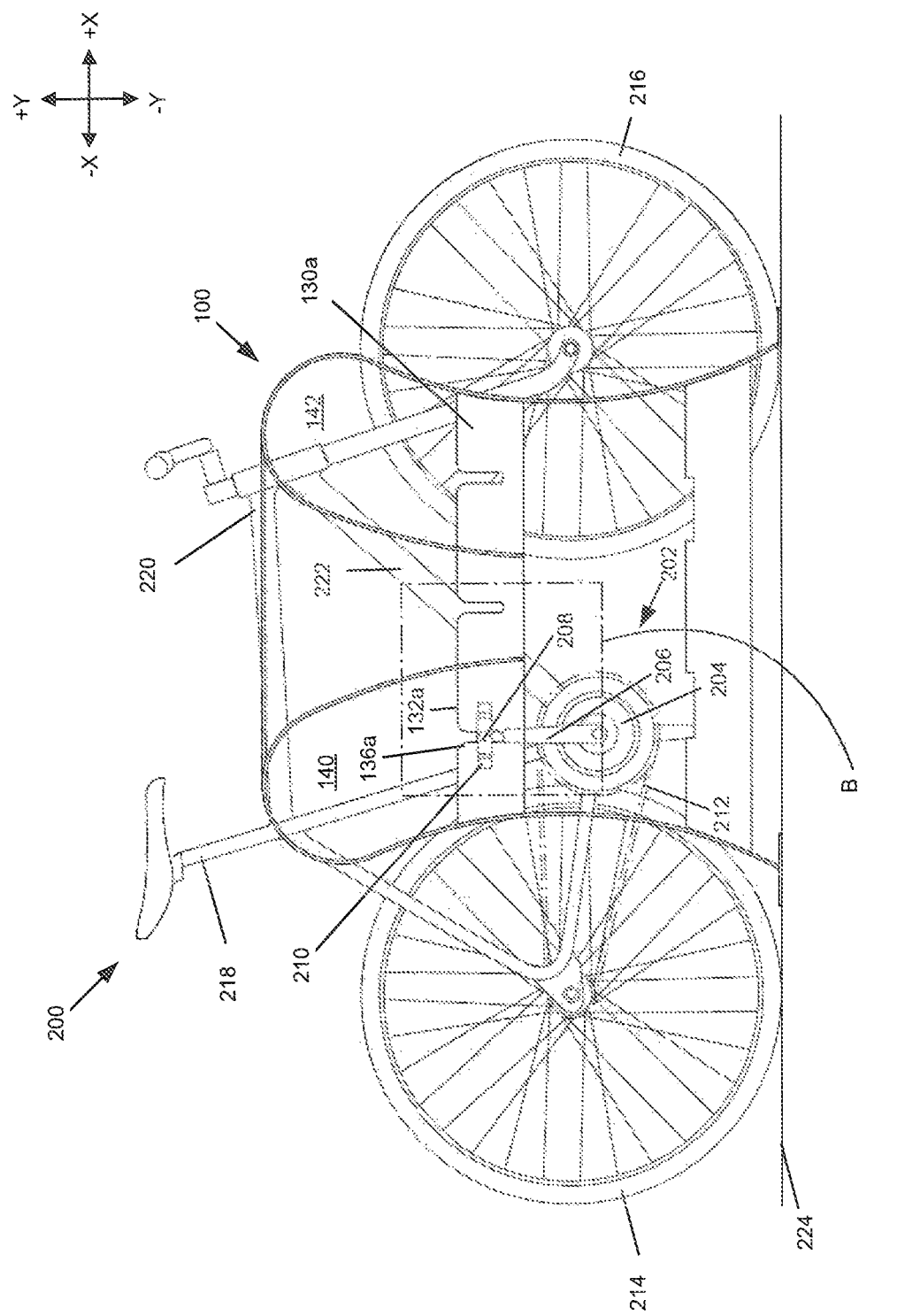
FIG. 7 is a schematic view of a bicycle supported at a pedal axle of the crank arm, pedal axle, and pedal assembly in another slot on the upper edge of the upper curb bar of the rack of FIG. 1.

In some embodiments, bicycle 200 may be received by any available slot 136, for example slot 136*a*, 136*b*, and 136*c*, installed on curb bar 130. For example, as depicted in FIG. 7 and FIG. 8, pedal axle 208 of bicycle 200 may be received in slot 136*a*. As another example, pedal axle 208 of bicycle 200 may be received in slot 136*c*. Bicycle 200 may be received in slot 136, such as slot 136*a*, 136*b*, and 136*c*, while facing in either the positive-X or negative-X direction. This may allow pedal axle 208 of one or more other bicycles 200 to be received in an unoccupied slot 136, either on the same side of rack 100 as bicycle 200 or on the opposite side of rack 100, for the one or more other bicycles 200 to be supported in a generally upright position at pedal axle 208 by slots 136 of rack 100 facing in either the positive-X or negative-X direction.

In some embodiments, upper edge 132*b* and/or lower edge 134*b* of lower curb bar 130*b* may comprise slots 136. Bicycle 200 facing the positive-X direction may be supported in a generally upright position using slots 136 of lower curb bar 130*b* in a manner generally similar as described above, except crank arm 206 may be pointed generally in the negative-X and/or negative-Y direction for pedal axle 208 to be received in slots 136 located on upper edge 132*b* and/or lower edge 134*b* of lower curb bar 130*b*.

Figure 9:
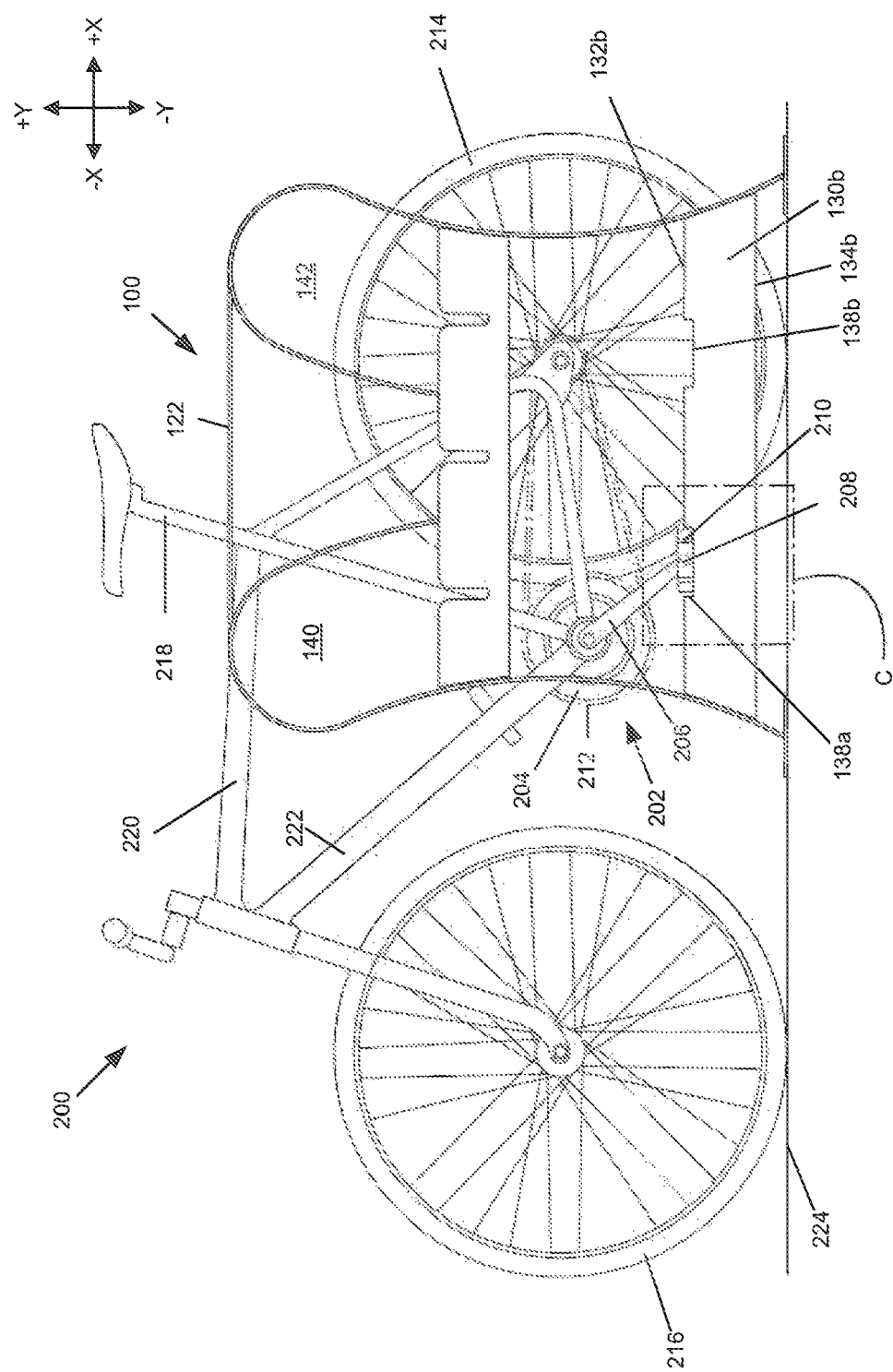
FIG. 9 is a schematic view of a bicycle supported at a pedal of the crank arm, pedal axle, and pedal assembly by a notch on an upper edge of a lower curb bar of the rack of FIG. 1.
Figure 10:
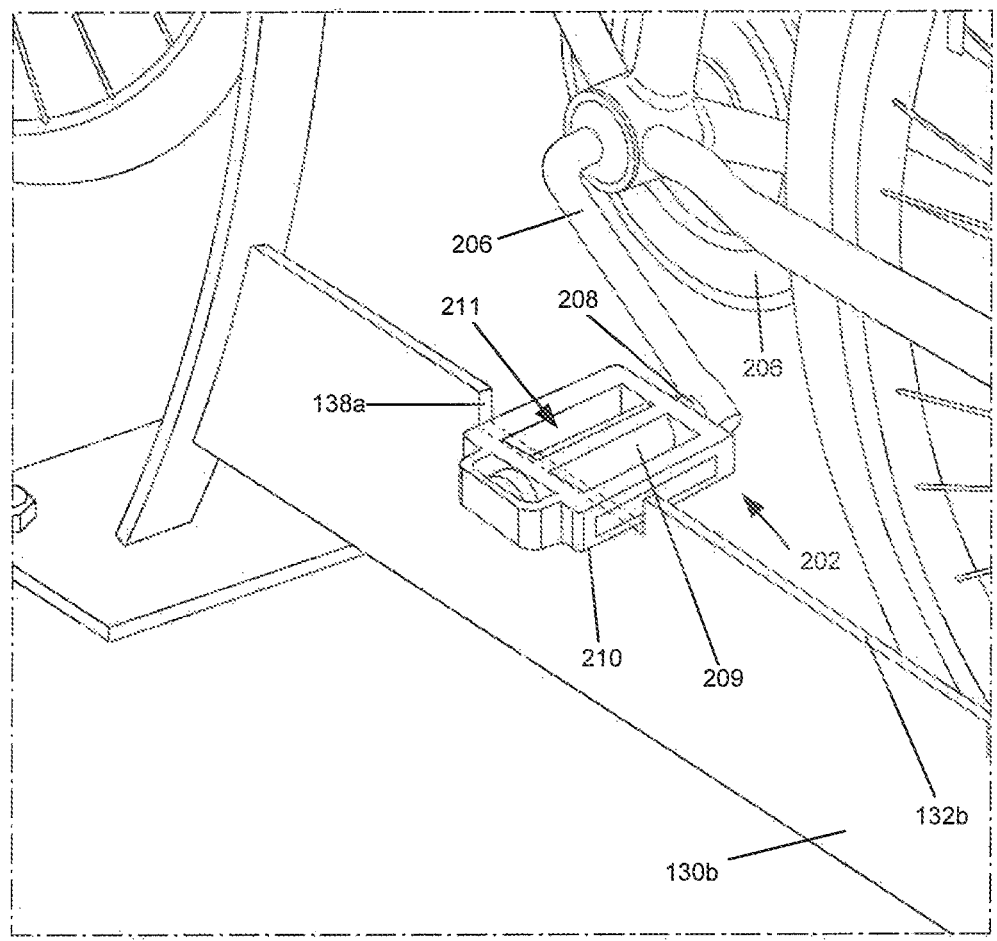
FIG. 10 is an enlarged perspective view of a portion of the rack of FIG. 9, the portion identified by window C as shown in FIG. 9, showing the interface of the pedal of the crank arm, pedal axle, and pedal assembly and the notch on the upper edge of the lower curb bar.

In some embodiments, bicycle 200 may be supported in a generally upright position at pedal 210 by notches 138 of rack 100 with the weight of bicycle 200 supported by rear wheel 214 and front wheel 216. As depicted in FIG. 9 and FIG. 10, notches 138*a* and 138*b* may be installed on upper edge 132*b* of lower curb bar 130*b*. In some embodiments, notches 138 may be installed on lower edge 134*b* of lower curb bar 130*b*, or notches 138 may be installed on upper edge 132*a* or lower edge 134*a* of upper curb bar 130*a*. As depicted in FIG. 9, bicycle 200 facing the negative-X direction may be supported at notch 138a, and crank arm 206 proximate to rack 100 may be pointed in the positive-X and negative-Y direction for pedal 210 to be positioned at notch 138a on the upper edge 132b of lower curb bar 130b.

Bicycle 200 may be placed generally parallel against rack 100 as illustrated in FIG. 9 to promote placement of pedal 210 against notch 138a and be received by notch 138a. A force, for example from a foot of a cyclist, may be applied on a pedal opposing pedal 210 so that pedal 210 may be in physical contact with and may apply a force to notch 138a.

The physical contact between pedal 210 and notch 138a, and the force applied by pedal 210 to notch 138a, may be increased by raising rear wheel 214 and rotating rear wheel 214 in a reverse direction. This may remove the slack in chain 212. As described herein, the reverse rotation of rear wheel 214 may apply torque to chain ring 204 and may cause chain ring 204 to rotate in the same reverse rotation. The reverse rotation of chain ring 204 may cause crank arm 206 to rotate in the same reverse rotation. The reverse rotation of crank arm 206 may increase the physical contact between pedal 210 and notch 138a and the force applied by pedal 210 to notch 138a.

Rear wheel 214 may be lowered to be in physical contact with surface 224. The friction force between rear wheel 214 and surface 224 may maintain the physical contact between pedal 210 and notch 138a, and the force applied by pedal 210 to notch 138a.

The force applied by pedal 210 to notch 138a may create friction between pedal 210 and notch 138a, which may hold pedal 210 stationary against notch 138a. When pedal 210 is in contact with notch 138a, notch 138a may prevent reverse rotation of the crank arm 206, pedal axle 208, and pedal 210. Notch 138a may apply a generally equal and opposite force to pedal 210. This force applied from notch 138a may translate to a torque that may be applied to chain ring 204 to balance the torque applied to chain ring 204 by rear wheel 214. These balanced forces and torques may restrict movement of bicycle 200, crank assembly 202, chain 212, and rear wheel 214.

As depicted in FIG. 10, pedal 210 may have a pedal channel 211 extending through pedal 210. In some embodiments, notches 138, such as notch 138a and 138b, may comprise teeth for receiving in pedal channel 211 to promote placement of pedal 210 against notches 138 and to promote reception of pedal 210 by notches 138. Teeth on notches 138 may further promote friction between pedal 210 and notches 138.

With pedal 210 in physical contact against and received by notch 138a, notch 138a may frictionally and/or torsionally hold bicycle 200 in a generally upright position.

When bicycle 200 is supported by against notch 138a in a generally upright position, as depicted in FIG. 9 and FIG. 10, bicycle 200 may be locked to rack 100 at multiple points. As described herein, seat bar 218 and/or rear wheel 214 may be locked through second frame ring 142, top bar 220 may be locked with frame bar 122, down bar 222 and/or front wheel 216 may be locked through first frame ring 140, or a combination thereof. Rear wheel 214, front wheel 216, seat bar 218, top bar 220, and/or down bar 222 may be locked to rack 100 using appropriate locking devices, such as a U-lock, cable lock, chain and padlock, combination lock, and the like.

As depicted in FIG. 9, bicycle 200 may be facing in the negative-X direction with crank arm 206 proximate to rack 100 pointed in the positive-X and negative-Y direction when supported in a generally upright position at pedal 210 by notch 138a. If bicycle 200 is facing the positive-X direction, similar to bicycle 200 as depicted in FIG. 7 and FIG. 8, crank arm 206 proximate to rack 100 may be pointed in the negative-X and negative-Y direction for pedal 210 to be positioned and supported at notch 138a on upper edge 132b of lower curb bar 130b.

In some embodiments, bicycle 200 may be received by any notch 138 installed on curb bar 130. This may allow a pedal of another bicycle to be received in an unoccupied notch, such as notch 138b, either on the same side of rack 100 as bicycle 200 or on the opposite side of rack 100 to be supported in a generally upright position by rack 100 facing in either the positive-X or negative-X direction.

As depicted in FIG. 4 through FIG. 8, bicycle 200 may be supported by and secured to rack 100 while bicycle 200 is facing generally in the positive-X direction. In some embodiments, as depicted in FIG. 9 and FIG. 10, bicycle 200 may be supported by and secured to rack 100 while facing generally in the negative-X direction. Rack 100 may support bicycle 200 while bicycle 200 is facing in either the positive-X or negative-X direction.

Similarly, as depicted in FIG. 4 through FIG. 10, bicycle 200 may be supported by and secured to rack 100 at one side of rack 100. In some embodiments, bicycle 200 may be supported by and secured to rack 100 on either side of rack 100.

In some embodiments, rack 100 may support more than one bicycle at a time, such as two or more bicycles. Rack 100 may be manufactured to have a length, and the mounting surface may define a length of upper edge 132 or a lower edge 134, and/or the mounting surface may define a number of slots 136 or notches 138, such that rack 100 may support one or more bicycles 200 at a time on either or both sides of rack 100. For example, rack 100 may support two bicycles 200. Rack 100 may support a first bicycle 200 and a second bicycle 200 at the same time. The first bicycle 200 and the second bicycle 200 may be supported by rack 100 while positioned on the same side of rack 100, or the first bicycle 200 may be positioned on a first side of rack 100, and the second bicycle 200 may be positioned on a second side of rack 100. As another example, rack 100 may support more than two bicycles 200. One or more bicycles 200 may be supported on a first side of rack 100, and/or one or more bicycles 200 may be supported on a second side of rack 100.

In some embodiments, a plurality of racks 100 may be configured to form a bicycle parking area. Racks 100 may be arranged in a row, arranged next to each other, or a combination thereof. A bicycle parking area comprising racks 100 may allow a cyclist to use either side of a row of racks 100 to support and secure bicycle 200 from a single access corridor between two rows of racks 100.

In some examples, a bicycle parking area comprising two rows of racks 100, each row comprising four racks 100, may support and secure 16 bicycles 200. Said bicycle parking area may require 216 square feet, or 13.5 square feet per bicycle.

In some examples, a bicycle parking area comprising one row of racks 100, the row comprising four racks 100, may support and secure eight bicycles 200. Said bicycle parking area may require 84 square feet when said bicycle parking area is positioned against a wall, or 10.5 square feet per bicycle.

In some embodiments, rack 100 may support bicycle 200 in a generally upright position using a structural element of bicycle 200 that may be common to most bicycles. Rack 100 may be in physical contact with crank assembly 202, for example, pedal axle 208 or pedal 210 of bicycle 200. This may allow rack 100 to support and secure bicycles of different configurations and types as crank assembly 202, pedal axle 208 or pedal 210 may be features commonly shared by bicycles of different configurations and types. For example, rack 100 may support a bicycle with or without a diamond-shaped frame, a bicycle made for an adult, a bicycle made for a child, a recumbent bicycle, a touring bicycle, a handcycle, and the like, as these types of bicycles have pedal axles and pedals.

In some embodiments, rack 100 may support bicycle 200 in a generally upright position. This may allow bicycle 200 to be seen clearly to identify bicycle 200 from a plurality of bicycles. This may also allow the aesthetics of bicycle 200 to be seen. With bicycle 200 supported in a generally upright position by rack 100, it may promote a neat and organized appearance, as opposed to a sloppy and disorganized appearance with front wheel askew if bicycle 200 is leaned against a traditional bicycle rack. A clean and tidy appearance may promote respect for rack 100 and bicycle 200. In addition, when bicycle 200 is supported in a generally upright position by rack 100, bicycle 200 may be protected from scrapes, scratches, or other forms of damage that may be caused when leaning bicycle 200 against a bicycle rack. In some embodiments, a plurality of racks 100 may be used to form a bicycle parking area. Bicycles 200 supported and secured in a bicycle parking area comprising racks 100 may similarly have a neat, organized, clean, and tidy appearance.

In some embodiments, rack 100 may support bicycle 200 when bicycle 200 is facing in the positive-X or negative-X direction as illustrated in FIG. 4 through FIG. 10, and on either side of rack 100. Rack 100 may not require bicycle 200 to be oriented in a particular direction, or be positioned on a particular side of rack 100, for bicycle 200 to be supported by and secured to rack 100. This may promote convenience when using rack 100 to support and secure bicycle 200. For example, where there is an impediment on one side of rack 100, bicycle 200 may be secured on the unimpeded side of rack 100.

In some embodiments, rack 100 may support one or more bicycles 200 on either side of rack 100 at the same time. Bicycles 200 may be facing in the positive-X or negative-X direction as illustrated in FIG. 4 through FIG. 10. This may promote efficiency of use of land allocated to rack 100. For example, a certain area of land may be designated as a bicycle parking area. A bicycle parking area using a certain number of racks 100 may support and secure more bicycles 200 than bicycle racks that support bicycles 200 from only one side.

In some embodiments, when bicycle 200 is supported by rack 100, it may allow bicycle 200 to be secured to rack 100 at multiple points of rack 100. As described herein, seat bar 218 and/or rear wheel 214 may be locked through first frame ring 140, top bar 220 may be locked with frame bar 122, down bar 222 and/or front wheel 216 may be locked through second frame ring 142, or a combination thereof. This may promote security of bicycle 200 when secured to rack 100, and may promote increased confidence and use of a bicycle as a method for transportation when rack 100 to support and secure bicycle 200 is available.

In some embodiments, rack 100 may meet the performance requirements outlined by the Association of Pedestrian and Bicycle Professionals including being generally visible to nearby pedestrians or drivers when not in use. This may reduce a risk of tripping over rack 100 by pedestrians.

In some embodiments, rack 100 may provide multiple supporting and locking points to support and secure bicycles of various sizes and various configurations.

As described above, curb bar 130 may comprise a mounting surface for exerting a torque on crank assembly 202 of bicycle 200 to frictionally and/or torsionally hold the bicycle in a generally upright position for securing the bicycle to rack 100. In some embodiments, the mounting surface of curb bar 130 may define notches 138 for receiving and physically contacting pedal 210 of bicycle 200.

Figure 11A:
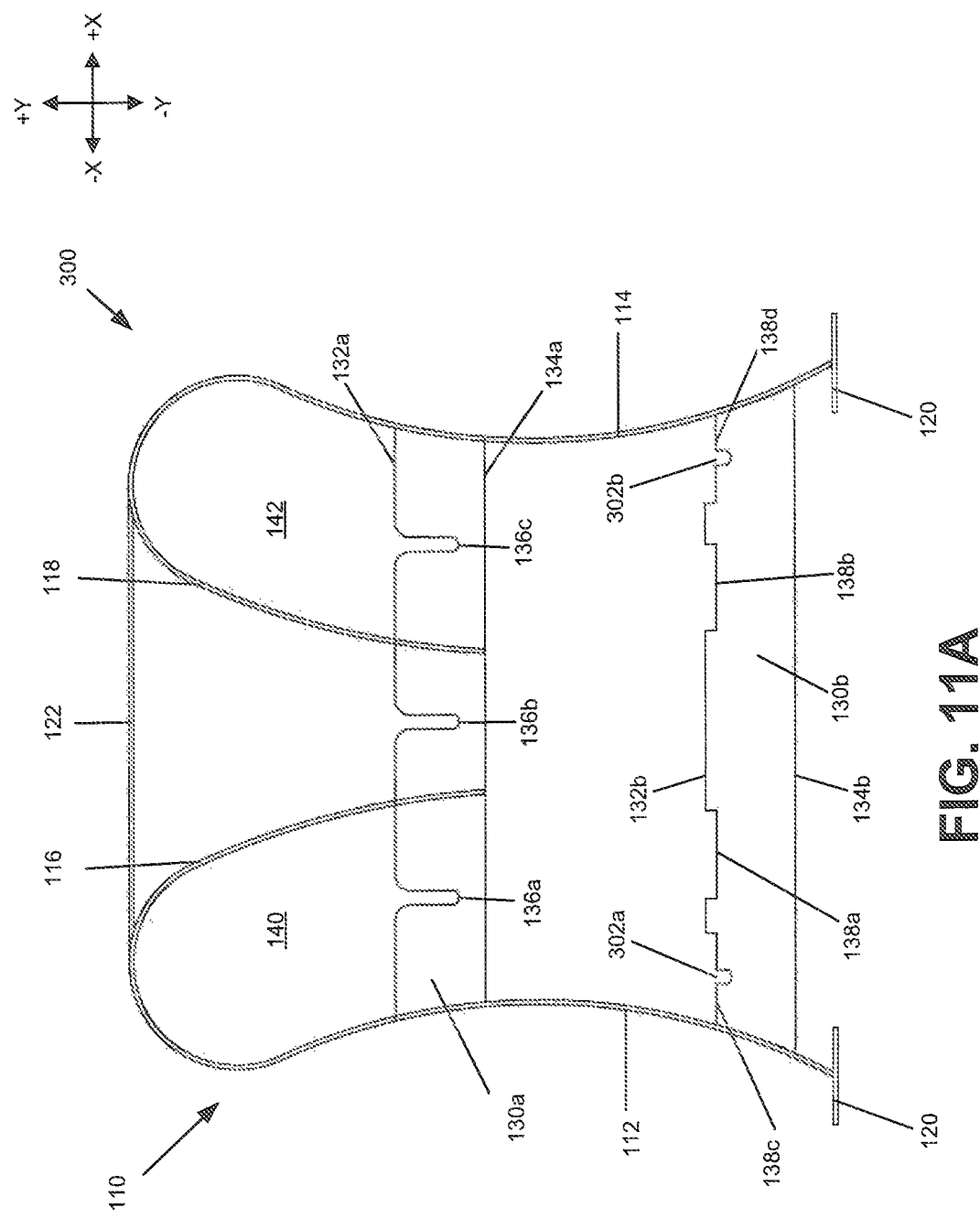
FIG. 11A is a front view of another rack comprising notches and notch slots on the upper edge of the lower curb bar.
Figure 11B:
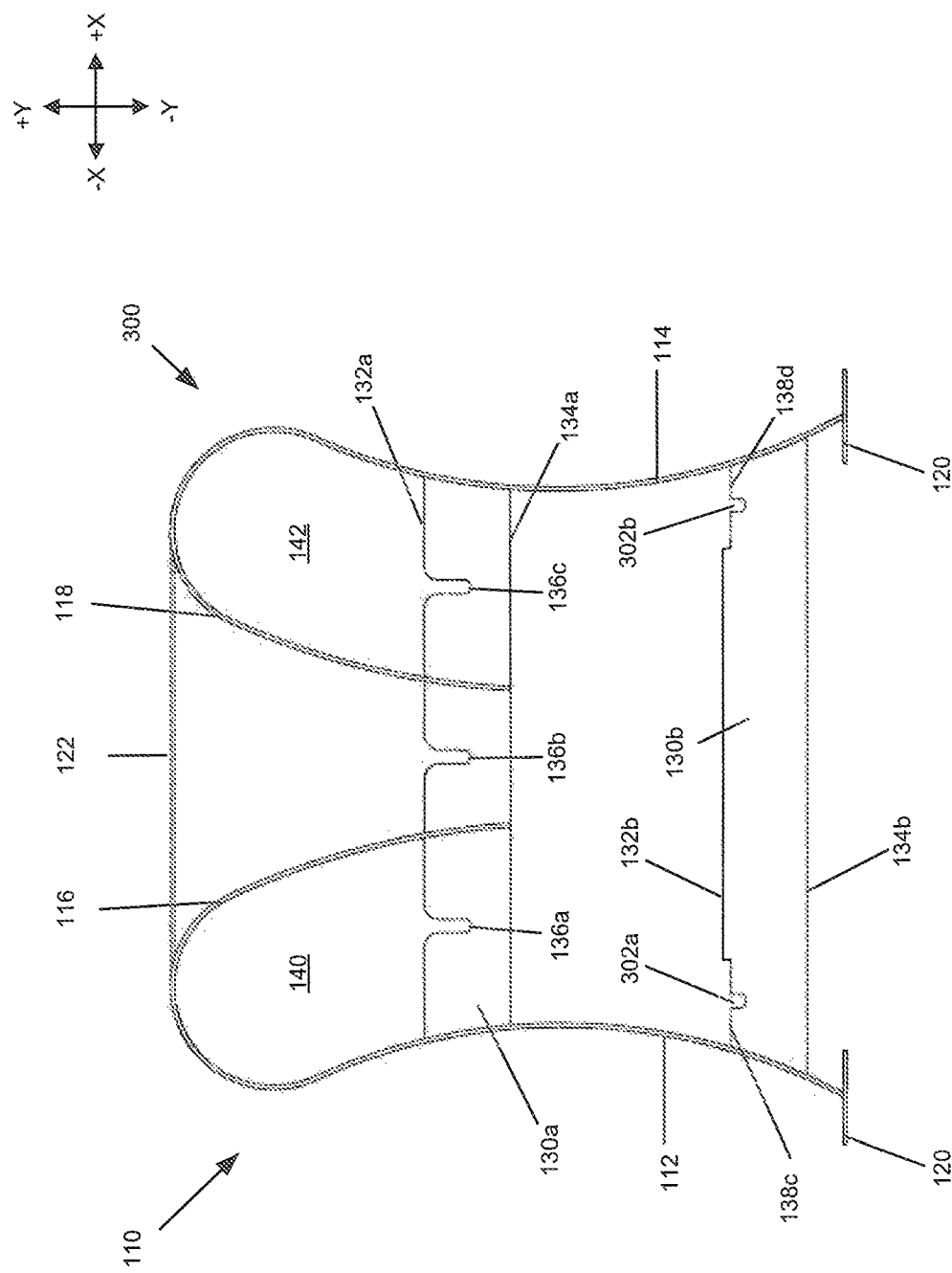
FIG. 11B is an embodiment of the rack of FIG. 11A.

Other configurations of notches 138 are possible. For example, FIG. 11A depicts a rack 300 that may be generally similar to rack 100, except notches 138 of rack 300 may comprise notch slots 302. As illustrated in FIG. 11A, rack 300 may comprise notches 138a, 138b, 138c, and 138d. Notch 138c and notch 138d may comprise notch slot 302a and notch slot 302b (individually and collectively, notch slot 302), respectively. Notch 138c and notch 138d may be positioned at the ends of lower curb bar 130b, as shown in FIG. 11A. In some embodiments, rack 300 may comprise notches 138c and 138d only, as shown in FIG. 11B.

Notch slots 302 may be generally similar to slots 136. Notch slots 302 may receive pedal axle 208 of crank assembly 202 of bicycle 200. The width of notch slots 302 may be sized for receiving pedal axle 208 with a standard pedal axle diameter. In some embodiments, the depth of notch slots 302 may be sized such that when notch slots 302 receive pedal axle 208, bicycle 200 may be supported by rear wheel 214 and front wheel 216 without also being supported at the end of notch slots 302. In some embodiments, notch slot 302 may have a depth generally similar to the diameter of a standard pedal axle 208. Where notch slot 302 has said depth generally similar to the diameter of a standard pedal axle 208, when pedal axle 208 is received by notch slot 302, pedal axle 208 may apply a force to the bottom edge of notch slot 302. Resting rear wheel 214 on surface 224 may cause chain ring 204, crank arm 206, pedal axle 208, and pedal 210 to resist movement. This may cause pedal axle 208 to maintain the force applied against the bottom edge of the notch slot 302. The bottom edge of notch slot 302 may apply a generally equal and opposite force to pedal axle 208. This force applied to pedal axle 208 and crank arm 206 may be translated into a torque applied to chain ring 204, chain 212, and rear wheel 214. The pedal axle 208 and the bottom of the notch slot 302 may apply generally equal and opposite forces, such that bicycle 200 may experience balanced forces and torques. The balanced forces and torques may restrict movement of the bicycle 200, and in particular, chain ring 204, crank arm 206, pedal axle 208, pedal 210, chain 212, and rear wheel 214. The mounting surface defining the opening of notch slots 302 may be bevelled, rounded, chamfered, or otherwise smoothed for receiving pedal axle 208 of bicycle 200.

Figure 12:
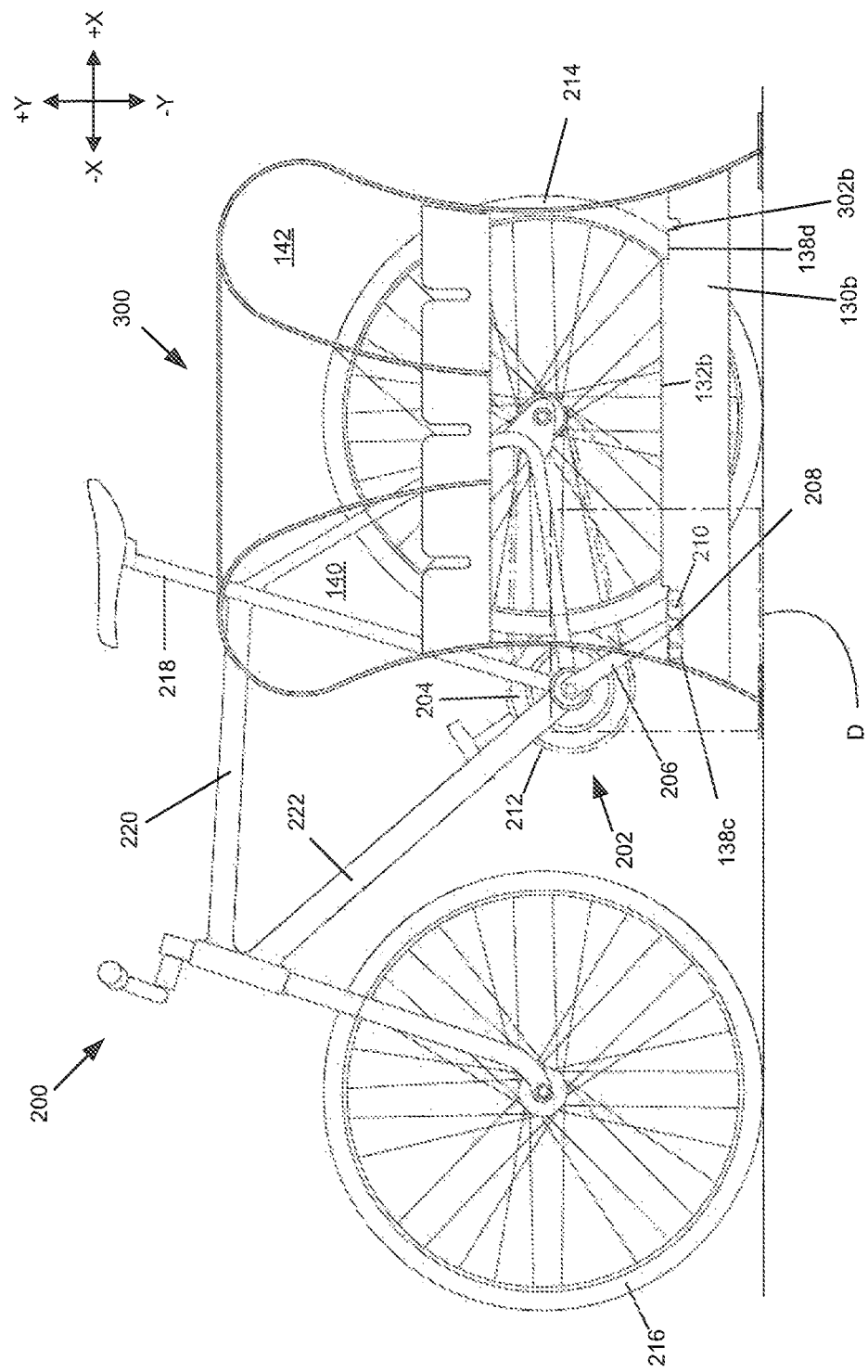
FIG. 12 is a schematic view of a bicycle supported at a pedal axle of the crank arm, pedal axle, and pedal assembly by a notch slot on an upper edge of the lower curb bar of the rack of FIG. 11B.

Bicycle 200 may be supported in a generally upright position at the exposed portion of pedal axle 208 by notch slot 302 of rack 300 with the weight of bicycle 200 supported by rear wheel 214 and front wheel 216. When bicycle 200 is supported by notch slot 302 and facing the negative-X direction, crank arm 206 may be pointed in the positive-X and negative-Y direction as shown in FIG. 12 for pedal axle 208 to be received in notch slot 302. When bicycle 200 is facing the positive-X direction and supported by notch slot 302, crank arm 206 may be pointed in the negative-X and negative-Y direction.

Bicycle 200 may be positioned adjacent and generally parallel to rack 300. Bicycle 200 may be lifted and positioned such that pedal axle 208 may be above notch slot 302. Bicycle 200 may be lowered, so notch slot 302 may receive pedal axle 208, and bicycle 200 may be rested on surface 224 with the weight of bicycle 200 supported by rear wheel 214 and front wheel 216 and may be held in a generally upright position by balanced frictional forces and torques at pedal axle 208 and bottom of notch slot 302.

Figure 13:
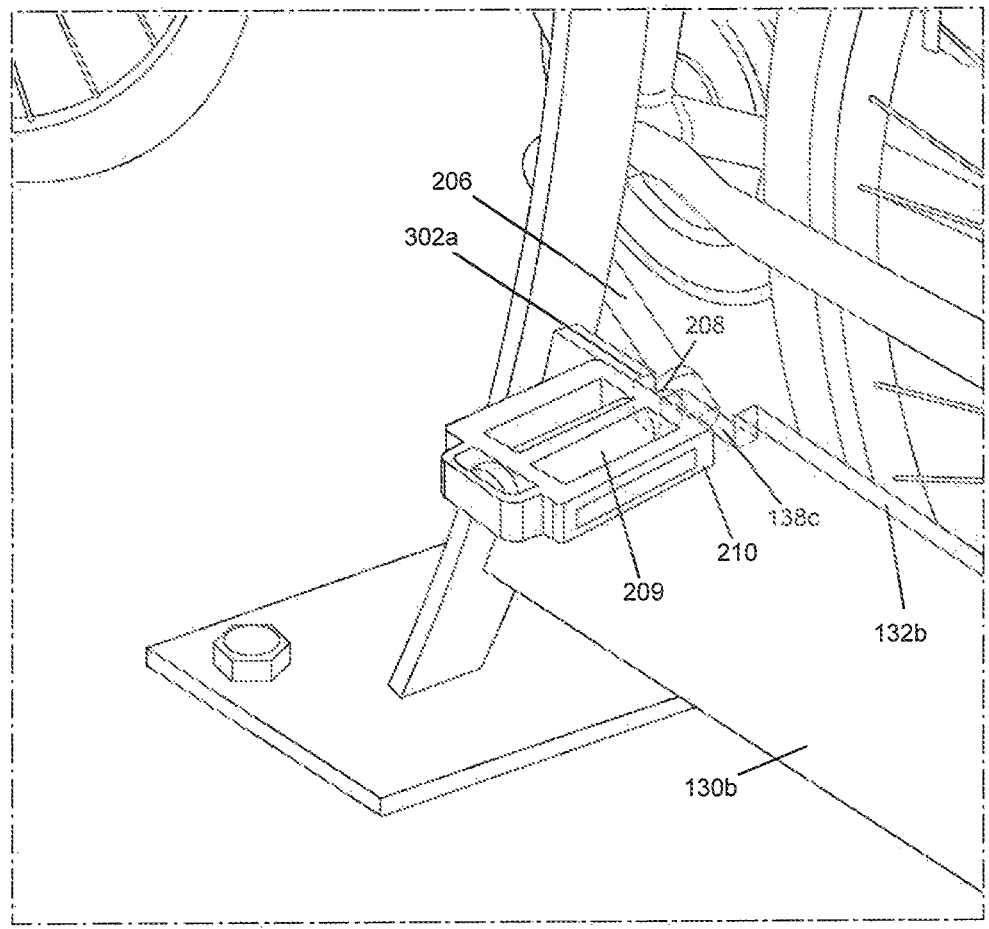
FIG. 13 is an enlarged perspective view of a portion of the rack of FIG. 12, the portion identified by window D as shown in FIG. 12, showing the interface of the pedal axle of the crank arm, pedal axle, and pedal assembly and the notch slot on the upper edge of the lower curb bar.

As shown in FIG. 12 and FIG. 13, with pedal axle 208 received in notch slot 302a, crank arm 206 may be on one side of lower curb bar 130b and pedal 210 may be on the other side of lower curb bar 130b, such that crank arm 206 and pedal 210 may be straddling lower curb bar 130b. The width of notch slot 302a may be narrower than the diameter of crank arm 206 or the length and width of pedal 210. When pedal axle 208 is received in notch slot 302a, lower curb bar 130b may prevent lateral movement of bicycle 200. In some embodiments, bicycle 200 may be prevented from falling away from rack 100. In some embodiments, bicycle 200, for example the frame of bicycle 200, may be prevented from leaning against rack 100.

The edges of notch slot 302a may restrict bicycle 200 from forward or reverse movement. The edges of notch slot 302a may apply a force against pedal axle 208 when bicycle 200 moves forward or reverse.

In some embodiments, rear wheel 214 may be rotated in a reverse direction such that pedal axle 208 may be in physical contact with and applying an increased force to edges of notch slot 302a in a manner as described herein for restricting movement of bicycle 200, crank assembly 202, chain 212, and rear wheel 214.

With pedal axle 208 received in notch slot 302a and/or be in physical contact against the edges of notch slot 302a, notch slot 302a may frictionally and/or torsionally hold bicycle 200 in a generally upright position.

When bicycle 200 is supported by notch slot 302a in a generally upright position, bicycle 200 may be locked to rack 100 at multiple points as described herein.

In some embodiments, bicycle 200 may be received by any available notch slot 302 installed on notch 138 of curb bar 130, such as notch slot 302a as depicted in FIG. 11A through FIG. 13, or notch slot 302b. This may allow pedal axle 208 of one or more other bicycles 200 to be received in an unoccupied notch slot 302 for the one or more other bicycles 200 to be supported at pedal axle 208 by notch slot 302, either on the same side of rack 100 as bicycle 200 or the opposite side of rack 100, in a generally upright position facing in either the positive-X or negative-X direction.

As described above and depicted in FIG. 4 through FIG. 13, rack 100 may comprise two curb bars 130, for example, upper curb bar 130a and lower curb bar 130b.

Figure 14:
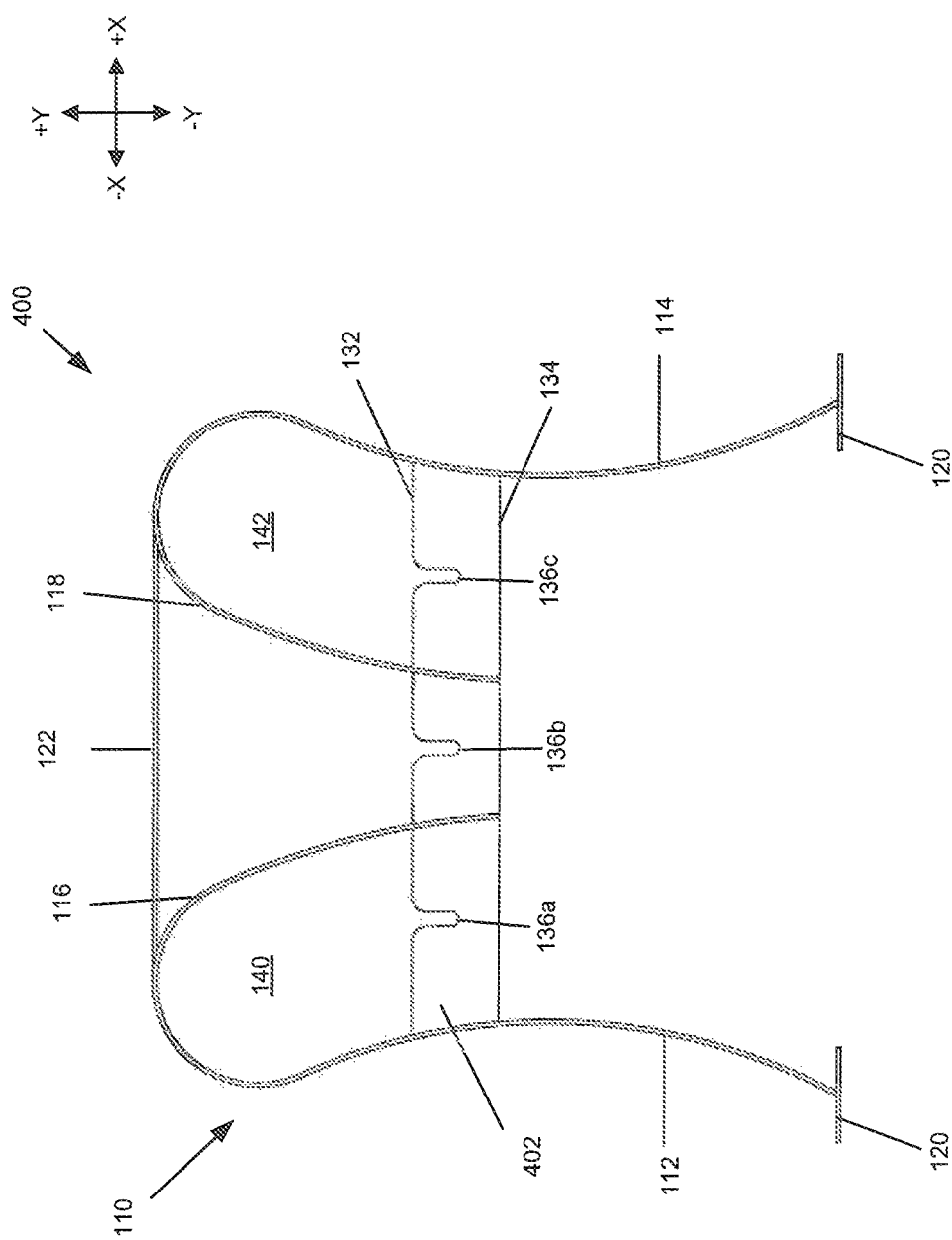
FIG. 14 is a front view of another rack with a curb bar.

Other configurations of curb bar 130 are possible. FIG. 14 is a front view of a rack 400 that may be generally similar to rack 100, except rack 400 has one curb bar 402. As depicted, curb bar 402 may be generally similar to upper curb bar 130a of rack 100. In some embodiments, curb bar 402 may be generally similar to lower curb bar 130b of rack 100. Curb bar 402 may comprise upper edge 132 and lower edge 134. Curb bar 402 may further comprise slots 136, such as slots 138a, 136b, and 136c as shown in FIG. 14. In some embodiments, curb bar 402 may comprise notches 138 and/or notch slots 302.

In some embodiments, curb bar 402 may be located at a height generally similar to upper curb bar 130a. In some embodiments, curb bar 402 may be located at a height generally similar to lower curb bar 130b. Curb bar 402 may be located at any appropriate height for supporting bicycle 200 in a generally upright manner as described herein.

Curb bar 402 may comprise a shape and/or size that may be appropriate for supporting bicycle 200 in a generally upright manner as described herein, such as a generally rectangular shape as illustrated in FIG. 14. In some embodiments, curb bar 402 may have an "S" shape, such that a portion of curb bar 402 may be located at a height generally similar to upper curb bar 130a and another portion of curb bar 402 may be located at a height generally similar to lower curb bar 130b, said upper and lower portions of curb bar 402 connected by a middle portion of curb bar 402. In some embodiments, curb bar 402 may have a sinusoidal shape, wave-like shape, crenellated shape, irregular shape, and the like.

Bicycle 200 may be supported by rack 400 as depicted in FIG. 14 in a generally upright position at the exposed portion of pedal axle 208 or at pedal 210. In some embodiments, bicycle 200 may be supported by upper edge 132 or lower edge 134 of curb bar 402 or slots 136 with the weight of bicycle 200 supported by rear wheel 214 and front wheel 216 as described herein.

Figure 15:
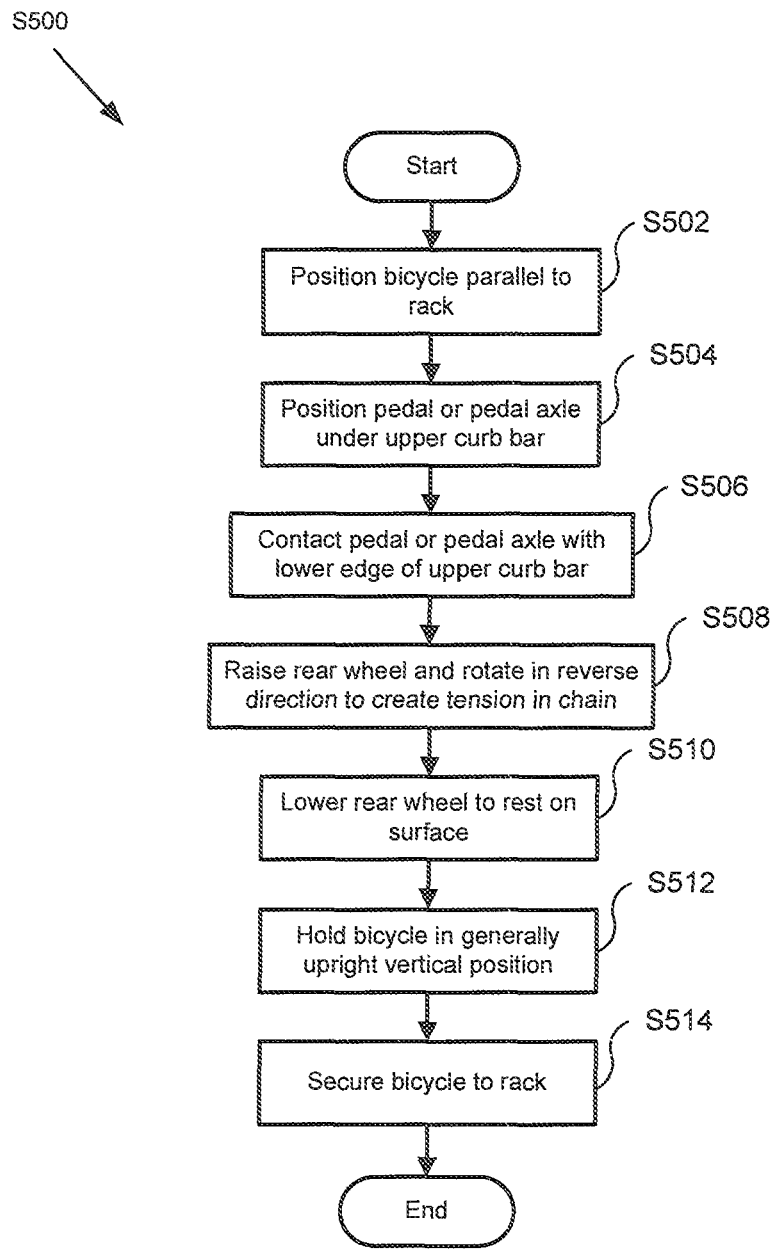
FIG. 15 is a flow chart depicting a method of using the pedal or pedal axle of the crank arm, pedal axle, and pedal assembly to support a bicycle in a generally upright position using the lower edge of the upper curb bar of the rack of FIG. 1.

FIG. 15 depicts a process S500 for supporting bicycle 200 in a generally upright position with lower edge 134a of upper curb bar 130a of rack 100.

At block S502, bicycle 200 is positioned generally parallel to either side of rack 100, bicycle 200 facing in either the forward or reverse direction.

At block S504, bicycle 200 is moved towards rack 100 to position pedal axle 208 or pedal 210 under lower edge 134a of upper curb bar 130a.

At block S506, pedal axle 208 or pedal 210 may be physically contacted with lower edge 134a of upper curb bar 130a. For example a downward force, such as from a foot of a cyclist, may be applied to a pedal opposing pedal 210 to promote physical contact between pedal axle 208 or pedal 210 and lower edge 134a of upper curb bar 130a. Pedal axle 208 or pedal 210 may apply a force to lower edge 134a of upper curb bar 130a.

In some embodiments, pedal axle 208 or pedal 210 may be in physical contact with a marked spot on lower edge 134a of upper curb bar 130a. When bicycle 200 is supported by rack 100 at the marked spot, bicycle 200 may be aligned relative to rack 100 to secure bicycle 200 on multiple points of rack 100.

At block S508, rear wheel 214 may be raised off surface 224 and may be rotated in a reverse direction to create tension in chain 212. This may cause pedal axle 208 or pedal 210 to apply additional force to lower edge 134a of upper curb bar 130a.

At block S510, rear wheel 214 may be lowered to rest on surface 224. This may maintain the force applied by pedal axle 208 or pedal 210 to lower edge 134a of upper curb bar 130a. The force applied by pedal axle 208 or pedal 210 to lower edge 134a of upper curb bar 130a may create friction between pedal axle 208 or pedal 210 and lower edge 134a of upper curb bar 130a for lower edge 134a of upper curb bar 130a to frictionally and/or torsionally hold bicycle 200 in a generally upright position. An equal and opposite force applied from lower edge 134a of upper curb bar 130a to pedal axle 208 or pedal 210 may apply a torque to chain ring 204 for counterbalancing a torque applied to chain ring 204 from rotating rear wheel 214 in a reverse direction.

At block S512, bicycle 200 is held in a generally upright position by rack 100.

At block S514, bicycle 200 may be secured and locked onto rack 100 at multiple points.

Figure 16:
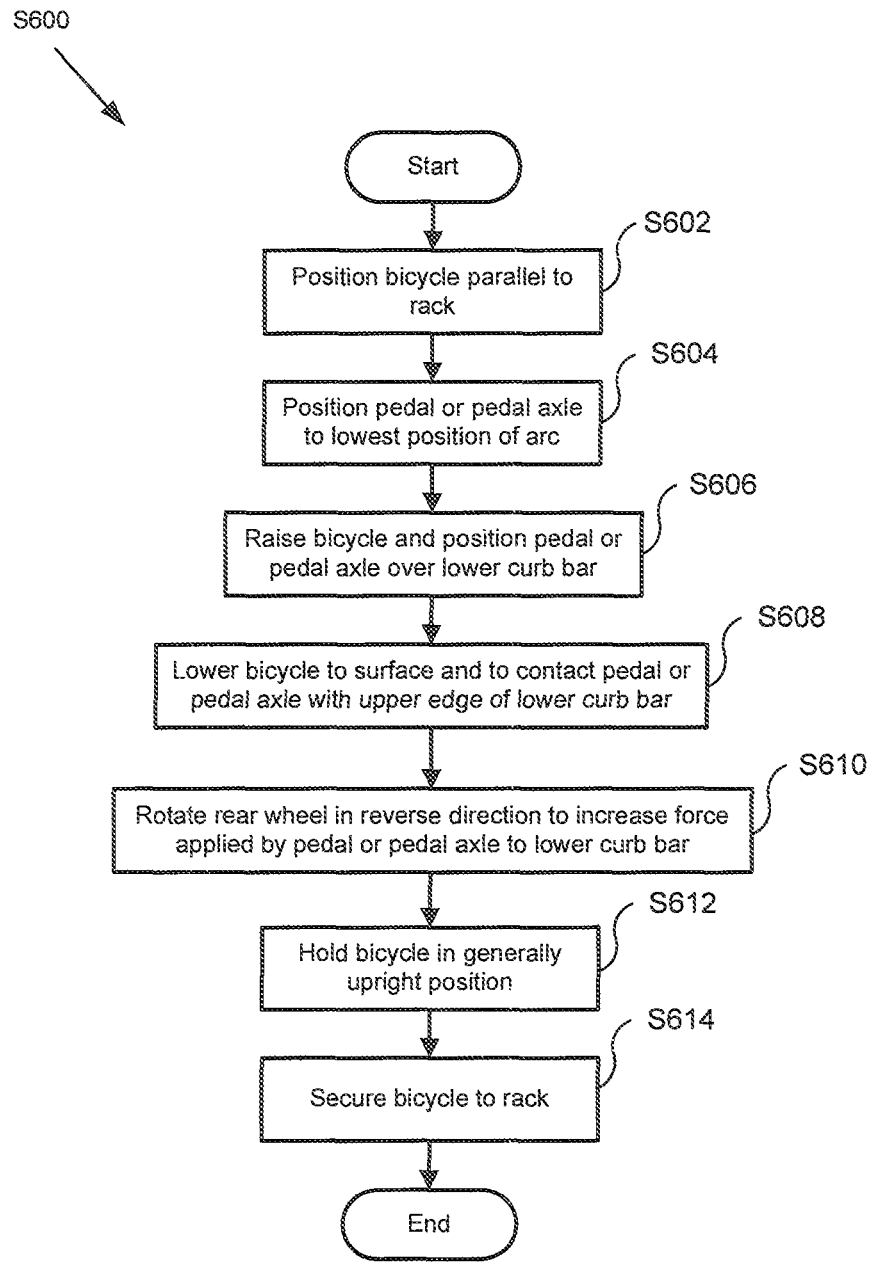
FIG. 16 is a flow chart depicting a method of using the pedal or pedal axle of the crank arm, pedal axle, and pedal assembly to support a bicycle in a generally upright position using the upper edge of the lower curb bar of the rack of FIG. 1.

FIG. 16 depicts a process S600 for supporting bicycle 200 in a generally upright position with upper edge 132b of lower curb bar 130b of rack 100.

At block S602, bicycle 200 is positioned generally parallel to either side of rack 100, bicycle 200 facing in either the forward or reverse direction.

At block S604, pedal axle 208 or pedal 210 that is proximate to rack 100 may be positioned at the lowest point of its rotation.

At block S606, bicycle 200 is moved towards rack 100 and bicycle 200, including rear wheel 214, is raised to position pedal axle 208 or pedal 210 over upper edge 132b of lower curb bar 130b.

At block S608, rear wheel 214 is lowered to rest on surface 224 and to engage pedal axle 208 or pedal 210 on upper edge 132b of lower curb bar 130b.

In some embodiments, crank arm 206 may be positioned to point generally behind bicycle 200 and in a downward direction, and pedal axle 208 or pedal 210 may be placed above upper edge 132b of lower curb bar 130b. Bicycle 200 may be lowered so that pedal axle 208 or pedal 210 may be physically contacted with upper edge 132b of lower curb bar 130b. Bicycle 200 may be lowered until rear wheel 214 and front wheel 216 are resting on surface 224. This may rotate crank arm 206 proximate to rack 100 to be pointed at a direction generally downward and behind bicycle 200. An upward force, such as from a foot of a cyclist, may be applied to a pedal opposing pedal 210 to promote physical contact between pedal axle 208 or pedal 210 and upper edge 132b of lower curb bar 130b. Pedal axle 208 or pedal 210 may apply a force to upper edge 132b of lower curb bar 130b.

In some embodiments, pedal axle 208 or pedal 210 may be in physical contact with a marked spot on upper edge 132b of lower curb bar 130b. When bicycle 200 is supported by rack 100 at the marked spot, bicycle 200 may be aligned relative to rack 100 to secure bicycle 200 on multiple points of rack 100.

At block S610, rear wheel 214 may be raised off surface 224 and may be rotated in a reverse direction to remove slack from chain 212. This may cause pedal axle 208 or pedal 210 to apply additional force to upper edge 132b of lower curb bar 130b. When rear wheel 214 is lowered to rest on surface 224, this may maintain the force applied by pedal axle 208 or pedal 210 to upper edge 132b of lower curb bar 130b. The force applied by pedal axle 208 or pedal 210 to upper edge 132b of lower curb bar 130b may create friction between pedal axle 208 or pedal 210 and upper edge 132b of lower curb bar 130b for upper edge 132b of lower curb bar 130b to frictionally and/or torsionally hold bicycle 200 in a generally upright position. An equal and opposite force applied from upper edge 132b of lower curb bar 130b to pedal axle 208 or pedal 210 may apply a torque to chain ring 204 for counterbalancing a torque applied to chain ring 204 from rotating rear wheel 214 in a reverse direction.

At block S612, bicycle 200 is held in a generally upright position by rack 100.

At block S614, bicycle 200 may be secured and locked onto rack 100 at multiple points.

Figure 17:
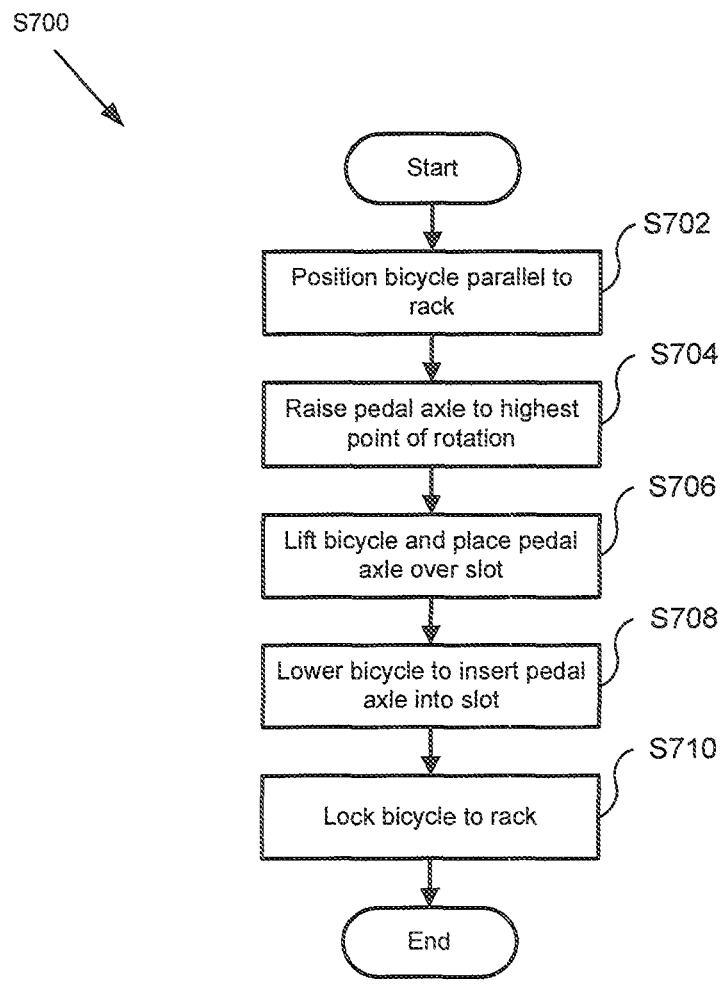
FIG. 17 is a flow chart depicting a method of using the pedal axle of the crank arm, pedal axle, and pedal assembly to support a bicycle in a generally upright position using the slots on the upper curb bar of the rack of FIG. 1.

FIG. 17 depicts a process 8700 for supporting bicycle 200 in a generally upright position with slots 136 on upper curb bar 130a of rack 100.

At block S702, bicycle 200 is positioned generally parallel to either side of rack 100, bicycle 200 facing in either the forward or reverse direction.

At block S704, pedal axle 208 that is proximate to rack 100 may be positioned generally at the highest point of its rotation.

At block S706, bicycle 200 is lifted and pedal is raised to place pedal axle 208 over the desired slot 136. In some embodiments, slot 136 may be located on upper edge 132a of upper curb bar 130a, for example, as depicted in FIG. 8.

At block S708, bicycle 200 is lowered to insert pedal axle 208 into slot 136. Pedal axle 208 may be received in slot 136 but may not be resting on bottom of slot 136. Crank arm 206 may be on one side of upper curb bar 130a, and pedal 210 may be on the other side of upper curb bar 130a. The width of slot 136 may be narrower than the diameter of crank arm 206 and the length or width of pedal 210. Rear wheel 214 and front wheel 216 may be resting on surface 224.

Lateral forces applied to bicycle 200 may be counteracted by upper curb bar 130a. In some embodiments, the side surface of upper curb bar 130a may apply a force on crank arm 206 or pedal 210 to counteract lateral forces applied to bicycle 200.

When pedal axle 208 is received in slot 136, edges of slot 136 may apply a force to pedal axle 208 to resist forward or reverse motion of bicycle 200.

In some embodiments, rear wheel 214 may be raised off surface 224 and may be rotated in a reverse direction to remove slack from chain 212. This may cause pedal axle 208 to apply force to the edge of slot 136. When rear wheel 214 is lowered to rest on surface 224, this may maintain the force applied by pedal axle 208 to slot 136. The force applied by pedal axle 208 to slot 136 may create friction between pedal axle 208 and slot 136 for slot 136 to frictionally and/or torsionally hold bicycle 200 in a generally upright position. An equal and opposite force applied from slot 136 to pedal axle 208 may apply a torque to chain ring 204 for counterbalancing a torque applied to chain ring 204 from rotating rear wheel 214 in a reverse direction.

At block S710, bicycle 200 is held in a generally upright direction by rack 100. This may allow bicycle 200 to be secured and locked onto rack 100 at multiple points.

The preceding discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only. The invention is defined by the appended claims.

What is claimed is:

1. A rack for supporting a bicycle in a generally upright position on a surface, the bicycle comprising a chain ring, a crank arm, a pedal axle, and a pedal, the rack comprising:
   a frame comprising a first leg and a second leg opposite the first leg, the first leg having a first end portion for mounting to the surface, and the second leg comprising a second end portion for mounting to the surface;
   a curb plate mounted to the first leg and the second leg, and extending between the first leg and the second leg, the curb plate comprising an upper edge and a lower edge, the lower edge positioned above at least one of the first end portion and the second end portion;
   wherein the lower edge of the curb plate is a mounting surface for exerting a counterbalancing force on the pedal axle, the pedal, or the chain ring of the bicycle to counterbalance a torque in the chain ring of the bicycle, the torque generated by reverse rotation of a rear wheel of the bicycle, to frictionally hold the bicycle in the generally upright position; and
   wherein a slot extends inwardly from the upper edge of the curb plate, the slot for receiving the pedal axle to prevent forward, reverse, and lateral movement of the bicycle to hold the bicycle in the generally upright position, wherein when the pedal axle is received in the slot, the crank arm and the pedal straddle the curb plate.

2. The rack of claim 1, wherein when the bicycle is supported by the curb plate, the bicycle is positioned relative to the rack for securing the bicycle to the rack.

3. The rack of claim 1, wherein the curb plate comprises a notch extending inwardly from the upper edge of the curb plate.

4. The rack of claim 3, wherein the notch comprises a notch slot extending inwardly from the notch.

5. The rack of claim 1, wherein the counterbalancing force is a frictional force, and the lower edge exerts the frictional force on the pedal axle of the crank assembly.

6. The rack of claim 1, wherein the counterbalancing force is a frictional force, and the lower edge exerts the frictional force on the pedal of the crank assembly.

7. The rack of claim 1, wherein the counterbalancing force is a torque, and the lower edge exerts the torque on the chain ring of the crank assembly.

8. The rack of claim 1, wherein the curb plate is an upper curb plate, and the rack further comprises a lower curb plate.

9. The rack of claim 8, wherein the upper curb plate and the lower curb plate each comprise an upper edge and a lower edge.

10. The rack of claim 9, wherein the slot extends inwardly from the upper edge of the upper curb plate.

11. The rack of claim 9, further comprising a notch extending inwardly from the upper edge of the lower curb plate.

12. The rack of claim 9, wherein the lower edge of the upper curb plate and the upper edge of the lower curb plate are mounting surfaces for exerting a counterbalancing force on the pedal axle, the pedal, or the chain ring of the bicycle to frictionally hold the bicycle in the generally upright position.

13. The rack of claim 1, wherein the frame defines a first side and second side of the rack, a proximal and distal end of the rack, and the bicycle can be supported when positioned on the first or second side of the rack, and facing the proximal or distal end of the rack.

14. The rack of claim 1, wherein the rack can support one or more bicycles in the generally upright position.

15. The rack of claim 1, wherein:
   the end portion of the first leg deflects inwardly to form a first frame arc;
   the end portion of the second leg deflects inwardly to form a second frame arc; and
   a frame bar connects the first frame arc and the second frame arc.

16. The rack of claim 15, wherein the curb plate is in connection with the first leg, the first frame arc, the second leg, and the second frame arc, the connection defining a first frame ring and a second frame ring.

17. The rack of claim 1, wherein the bicycle is secured to the rack at a seat bar of the bicycle.

18. The rack of claim 1, wherein the bicycle is secured to the rack at a seat bar and a rear wheel of the bicycle.

19. The rack of claim 1, wherein the bicycle is secured to the rack at a top bar of the bicycle.

20. The rack of claim 1, wherein the bicycle is secured to the rack at a down bar of the bicycle.

21. The rack of claim 1, wherein the bicycle is secured to the rack at a down bar and a front wheel of the bicycle.

22. The rack of claim 1, wherein when the pedal axle is received in the slot, the crank arm is pointed in a generally upward direction.

23. The rack of claim 1, wherein a plurality of slots extends inwardly from the upper edge of the curb plate, each one of the plurality of slots for receiving the pedal axle to prevent forward, reverse, and lateral movement of the bicycle to hold the bicycle in the generally upright position, wherein when the pedal axle is received in one of the slots, the crank arm and the pedal straddle the curb plate.

24. The rack of claim 1, wherein the curb plate is a metal plate extending along a length of the rack.

25. The rack of claim 1, wherein the lower edge is positioned generally 350 mm above at least one of the first end portion and the second end portion.

* * * * *